US009860135B2

(12) United States Patent
Piper et al.

(10) Patent No.: US 9,860,135 B2
(45) Date of Patent: Jan. 2, 2018

(54) BULK DEVICE PREPARATION

(71) Applicant: Invensys Systems, Inc., Foxboro, MA (US)

(72) Inventors: Charles W. Piper, Foxboro, MA (US); Vladimir D. Kostadinov, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 720 days.

(21) Appl. No.: 13/828,366

(22) Filed: Mar. 14, 2013

(65) Prior Publication Data

US 2014/0282020 A1 Sep. 18, 2014

(51) Int. Cl.
*G05B 23/02* (2006.01)
*H04L 12/24* (2006.01)
*G05B 19/042* (2006.01)

(52) U.S. Cl.
CPC .......... *H04L 41/22* (2013.01); *G05B 19/0426* (2013.01); *G05B 23/0272* (2013.01); *H04L 41/0853* (2013.01); *G05B 2219/25061* (2013.01); *G05B 2219/25067* (2013.01); *G05B 2219/25083* (2013.01); *G05B 2219/25428* (2013.01); *G05B 2219/31104* (2013.01)

(58) Field of Classification Search
CPC ........... G05B 2219/25061; G05B 2219/25067; G05B 2219/25428; G05B 23/0272; G05B 19/0426; G05B 2219/25083; G05B 2219/31104; H04L 41/22; H04L 41/0853
See application file for complete search history.

(56) References Cited

U.S. PATENT DOCUMENTS 5,971,581 A * 10/1999 Gretta et al. ............... 700/83
5,980,078 A   11/1999 Krivoshein et al.
2005/0055111 A1  3/2005 Law et al.
(Continued)

FOREIGN PATENT DOCUMENTS

DE     102011080955 A1     2/2013

OTHER PUBLICATIONS

Extended European Search Report for EP 14000943 dated Feb. 17, 2015.
(Continued)

*Primary Examiner* — Aaron Lowenberger
(74) *Attorney, Agent, or Firm* — Stephen Manetta; Ralph Graham

(57) ABSTRACT

A method and a system for preparing a plurality of installed field devices for operation in a process control network. In some embodiments, a computing device provides a visual summary of the installed field devices to a user via a user interface. A configuration database stores predefined device preparation scopes, each scope being indicative of one or more of the installed field devices. Based on a user selection of one or more predefined device preparation scopes in the user interface, the computing device implements each of the predefined device preparation scopes by, among other things, retrieving configuration information from the configuration database for each installed field device indicated by each predefined device preparation scope and transmitting the information to each respective installed field device for updating the device configuration.

24 Claims, 23 Drawing Sheets

(56) References Cited

U.S. PATENT DOCUMENTS

| | | | |
|---|---|---|---|
| 2005/0125085 A1 | 6/2005 | Prasad et al. | |
| 2005/0165922 A1* | 7/2005 | Hatano | 709/223 |
| 2005/0197806 A1* | 9/2005 | Eryurek et al. | 702/188 |
| 2009/0118843 A1* | 5/2009 | Rahman et al. | 700/79 |
| 2009/0292996 A1* | 11/2009 | Anne et al. | 715/736 |
| 2011/0144777 A1* | 6/2011 | Firkins et al. | 700/80 |
| 2011/0191500 A1* | 8/2011 | Odayappan et al. | 710/8 |
| 2011/0313547 A1* | 12/2011 | Hernandez et al. | 700/23 |

OTHER PUBLICATIONS

800XA Device Management and Fieldbus Overview, ABB Automation, Copyright 2010.

* cited by examiner

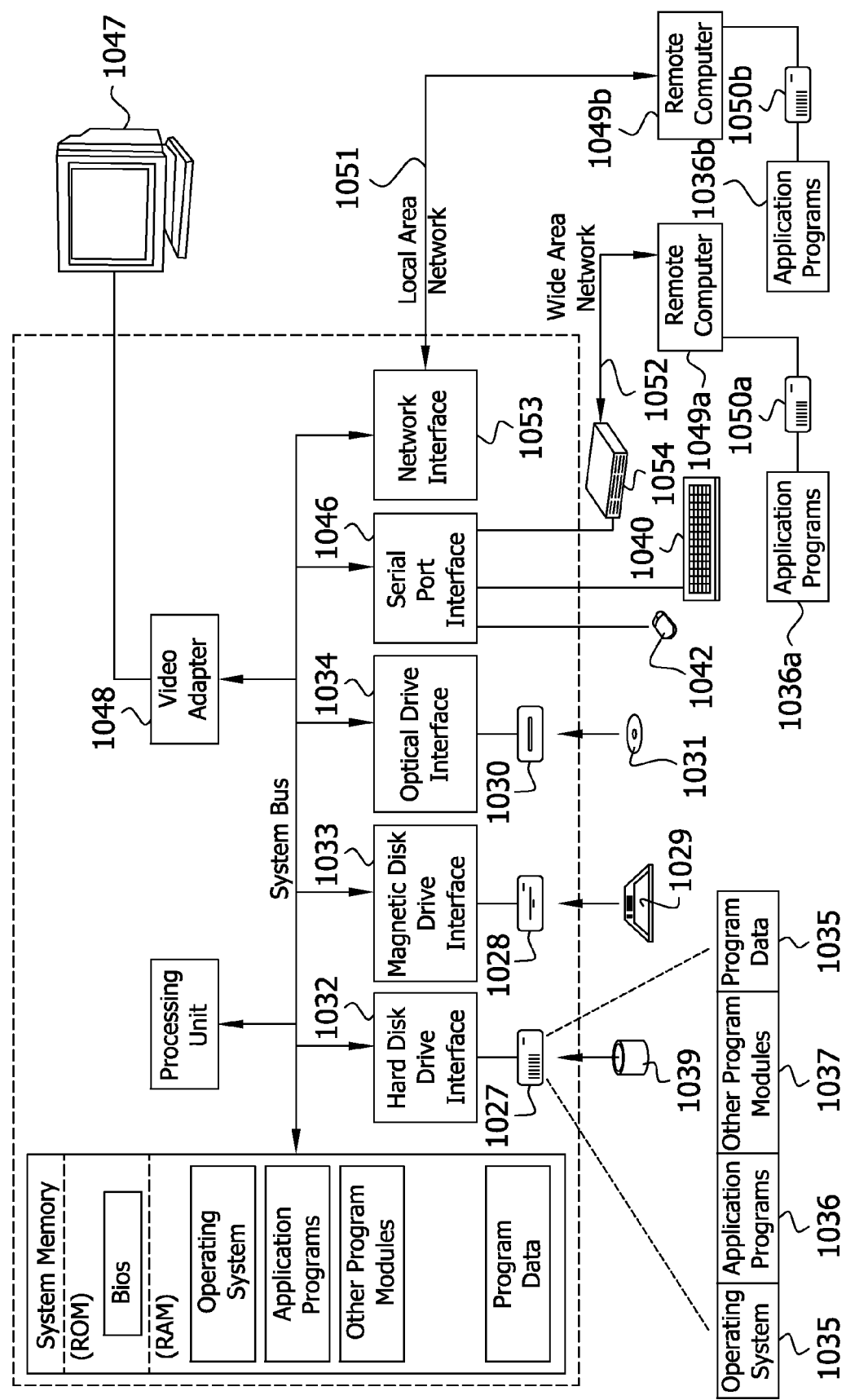

BULK DEVICE PREPARATION

BACKGROUND

The traditional preparation process for devices on a plant floor is typically a time-consuming, arduous process. Generally, the process generally begins with a user inspecting a list of the physical devices presented in a computer user interface, and correlating each physical instrument to a device in the database. Typically, the user performs this correlation by manually examining the database for a matching entry for each physical device. After each physical instrument has been correlated, the user manually sets a name tag and a network address for each and every device. In order to set the name tag, the user inputs a name tag change via the user interface, and then waits while the computer issues the appropriate commands to set the name tag and while the physical instrument processes the name tag. In order to set the network address, the user inputs a network address for the physical device via the user interface, and then once again waits while the computer issues commands to set the network address and the device sets the network address. The user next must determine whether the device should be a link schedule master, and if so, the user configures those settings and the computer transmits those settings to the device. The user then utilizes the user interface to command instantiation of any block types in the device.

In other words, the steps required in a traditional device preparation process are executed primarily in sequence and may take 15-20 minutes of setup time per device, if not more. Furthermore, since much of the process must be manually completed, the user must physically move from device to device to complete the device setup. On a big plant floor with several thousand devices, it may take several man-months or even several man-years to prepare all the devices. Errors and mis-configurations can easily make the process more complicated and result in a doubling or tripling of the time required to prepare all the devices.

SUMMARY

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

According to one aspect, a method for preparing a plurality of installed field devices for operation in a process control network comprises displaying, by a computing device connected to the communication network, a user interface providing a visual summary of the installed field devices to a user, i.e., the devices wired to the field device network. The user interface indicates a first preparation status of each installed field device. The first preparation status includes, among other things, one of a prepared status, a ready-to-prepare status, and a not-ready-to-prepare status. The method further comprises providing a storage device storing a configuration database. The database includes, among other things, predefined device preparation scopes, with each device preparation scope being indicative of one or more of the installed field devices. The predefined device preparation scopes define, among other things, a containment relationship between and among devices, e.g., a multi-drop fieldbus "contains" up to 32 devices that are connected to the multi-drop fieldbus, a fieldbus module "contains" up to 4 such multi-drop fieldbuses, and a control processor that "contains" multiple fieldbus modules. The method also comprises receiving, by the computing device, a designation of one or more predefined device preparation scopes from the user for preparing the plurality of installed field devices via the user interface, and then implementing, by the computing device, each of the one or more received device preparation scopes for updating the configuration of each of the plurality of installed field devices. The step of implementing each of the one or more received device preparation scopes includes, but is not limited to, retrieving configuration information for each installed field device indicated by each received device preparation scope from a configuration database. The method additionally comprises transmitting the retrieved configuration information for each installed field device via the communication network to each installed field device for updating the configuration of each installed field device for continued operation, with the updating of each of the installed field devices occurring substantially in parallel.

According to another aspect, a system for preparing a plurality of installed field devices for operation comprises a plurality of installed field devices, with each installed field devices being operatively connected to a communication network and a configuration database accessible via the communication network, with the configuration database including configuration information corresponding to each installed field device. The system further includes a computer processor configured to execute computer-executable instructions stored in a storage device. The instructions comprise instructions for, among other things, displaying a user interface to a user, with the user interface including visual summary of the installed field devices indicating a first preparation status of each installed field device. The first preparation status includes, among other things, one of a prepared status, a ready-to-prepare status, and a not-ready-to-prepare status. The instructions further comprise instructions for receiving one or more predefined device preparation scopes from the user for preparing the plurality of installed field devices via the user interface, each device preparation scope being indicative of one or more of the installed field devices, and then implementing each of the one or more received device preparation scopes for preparing the plurality of installed field devices. The instructions for implementing each of the one or more received device preparation scopes comprise instructions for retrieving configuration information for each installed field device indicated by each device preparation scope, based on the first preparation status, from the configuration database, and transmitting the retrieved configuration information for each installed field device to each installed field device for updating the configuration of each installed field device for continued operation. The updating of each of the installed field devices occurring substantially in parallel.

BRIEF DESCRIPTION OF THE DRAWINGS

FIG. 3B is an exemplary user interface screenshot for selecting two matched devices for device preparation according to aspects described herein.

FIG. 8 illustrates an exemplary screen shot/user interface for enabling communication of installed field devices after completion of the preparation process and user can enable control of the prepared devices according to various aspects described herein.

FIG. 10 is a block diagram illustrating an example of a suitable computing system environment in which aspects of the invention may be implemented.

Corresponding reference characters indicate corresponding parts throughout the drawings.

DETAILED DESCRIPTION

Figure 1:
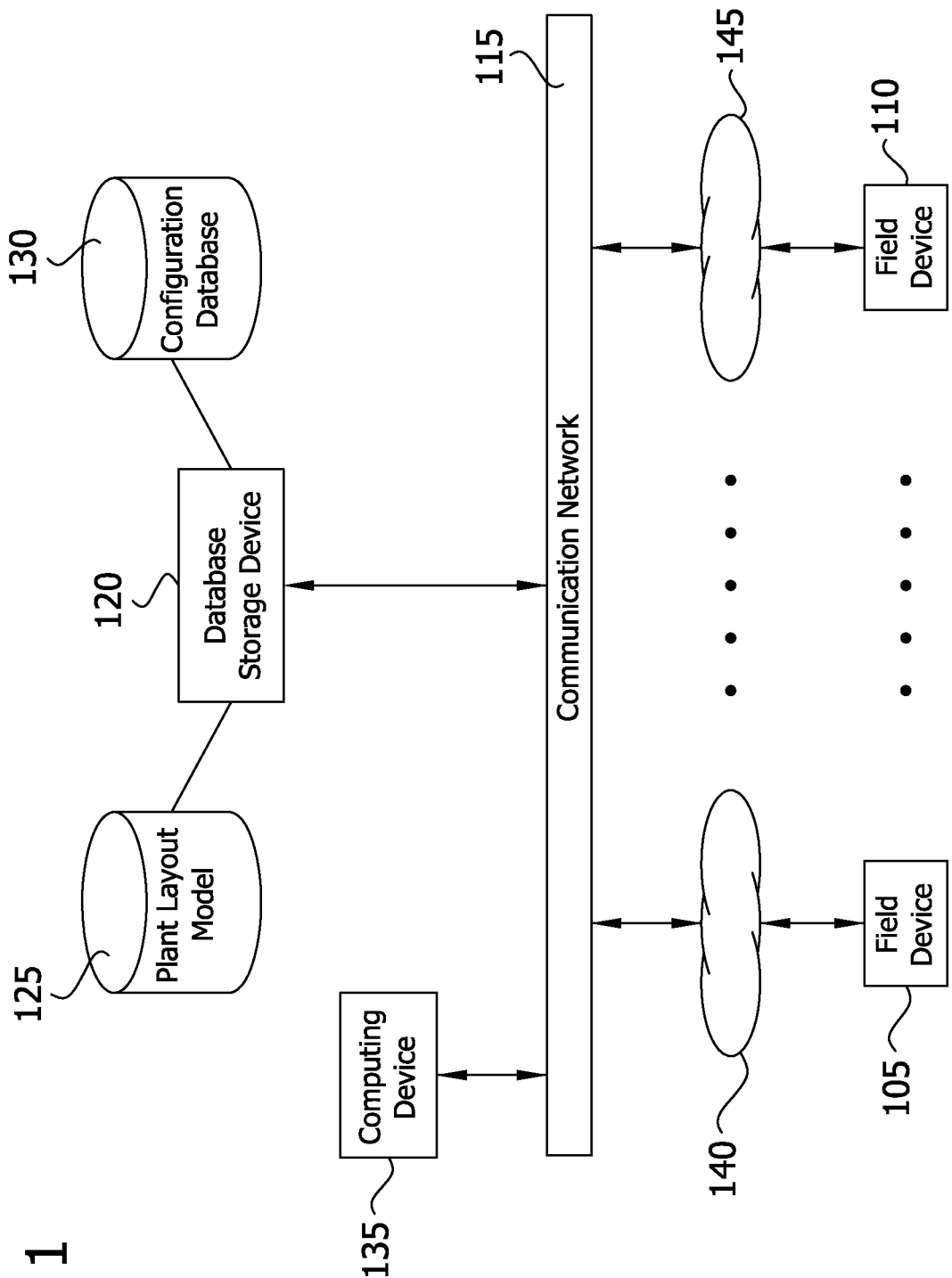
FIG. 1 illustrates an exemplary process control network environment according to various aspects described herein.

FIG. 1 illustrates an exemplary process control environment. In this exemplary environment, installed field devices 105 and 110 are operatively connected to a communication network 115, such as a wired or wireless network. While FIG. 1 shows two installed field devices, the process control environment can have any number of installed field devices. The exemplary environment further includes a database storage device 120 storing a plant layout model 125 and a configuration database 130. The plant layout model 125 includes, among other things, detailed information about each installed field device, such as manufacturer, device type, model number, firmware version, etc., and its location within the process control environment. In some embodiments, each installed field device identified in the plant layout model 125 has identifying information such as an assigned tagname and address, both of which may be reflected in the plant layout model 125.

Referring still to FIG. 1, the configuration database 130 stores, among other things, predefined device preparation scopes that indicate one or more installed fields devices included in the scope. For example, one predefined scope may indicate all installed field devices in a particular compound ("Building A"), while another predefined scope indicates all installed field devices that are connected to a particular hardware controller. The predefined device preparation scopes can also be indicative of one or more installed field devices located in a particular geographic or operational area, e.g., those installed field devices "contained" by a controller in a particular location. For example, the operational area includes, but is not limited to, one of a building, compound, and a plant area. In some embodiments, the predefined device preparation scopes overlap each other, in that some installed field devices are indicated by more than one predefined scope. The configuration database 130 additionally stores the configuration information that must be present in each installed field device, here devices 105 and 110, in order to operate correctly. The configuration information includes, but is not limited to, alphanumeric values, binary/Boolean values, or any other information that a particular device needs for proper operation. By way of example and not limitation, the configuration information may include a name and address corresponding to the particular device. In some embodiments, the plant layout model 125 and configuration database 130 are stored in the same database on the database storage device 120. In other embodiments, the information embodied by plant layout model 125 and/or configuration database 130 are stored in any available manner and/or format that is accessible via the communication network 115.

In FIG. 1, each installed field device 105 and 110 operatively connects to the communication network 115 via an appropriate network interface, depicted at 140 and 145 respectively. In one embodiment, the network interface is a field bus module ("FBM") that operatively connects to field device 105 and also operatively connects to the communication network 115. In other embodiments not illustrated, a FBM operatively connects to up to four fieldbus networks, each fieldbus network having up to four field devices, for up to a total of sixteen (16) field devices per FBM. In some embodiments, the FBM operatively connects to a control processor ("CP"), rather than the communication network 115, with the CP operatively connected to the communication network. Field device 110 may be operatively connected to the same FBM, another FBM, or may be operatively connected to the communication network 115 using a different device and/or method. Each FBM and/or CP in the exemplary environment in FIG. 1 has its own processor and memory, which permits each FBM and/or CP to operate in parallel with the other FBMs or CPs, in that each CP operates independent of other CPs and each FBM operates independent of other FBMs. The operation of CPs and FBMs in an exemplary process control network is further described below with respect to FIG. 4.

In an embodiment, the plant layout model 125, also referred to as a field device attachment model, is a structure of the FBMs attached to the CP and the field devices/instruments attached to each segment of the FBMs The exemplary environment in FIG. 1 also illustrates a user computing device 135 operatively connected to the communication network 115. The computing device 135 includes a display device (not shown) for displaying a user interface to the user. The user interface permits the user to select and prepare the installed field devices for operation in the process control environment, as explained in detail below.

In an alternative embodiment, aspects of the invention are embodied in a MESH communication network, such as an I/A Series® system available from Invensys Systems, Inc. As is known to those skilled in the art, the MESH network is a switched Ethernet network based on IEEE 802.3u (Fast Ethernet) and IEEE 802.3z (gigabit Ethernet) standards. In this embodiment, the computing device 135 communicates with the CPs via the MESH network. The CPs communicate with the FBMs via a PIO bus network, and the FBMs communicate with the field devices via an H1 fieldbus network.

Figure 2A:
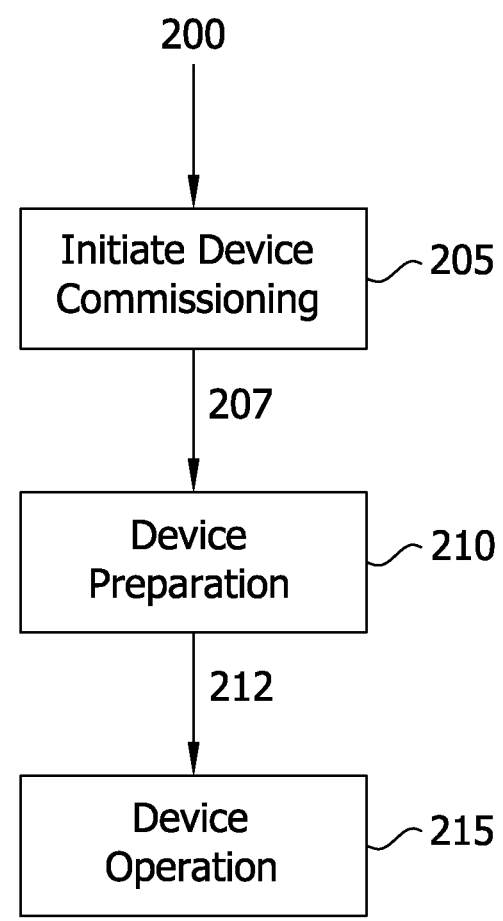
FIG. 2A illustrates an exemplary flow diagram of device commissioning, device preparation, and device operation according to various aspects described herein.

FIG. 2A illustrates an exemplary flow diagram of three different steps that devices in the process control environment go through to be processed, commissioned, and placed into operation. The process begins at 200 and proceeds to initiating device commissioning 205. Generally, this occurs when the user attaches the bus wires to the device. The process of device commission 205 generally identifies devices operatively attached to the network, matches the attached devices to a database of devices that can be attached to the network, and "marks" the matched devices. As described below, matching the devices includes identifying records in the database of the actual instruments that were wired in. In one embodiment, the user chooses appropriate tags and addresses and prepares the devices by making sure they have the correct tags and addresses and that blocks are instantiated and system parameters T1, T2, and T3 are set. In addition, each device is set to either Basic or Link Master. Once prepared, the FBM automatically takes care of setting the other necessary block parameters. This happens when the user presses Enable Control in the System Manager. Then once configured, the devices are calibrated, if necessary, and become completely operational.

Figure 2B:
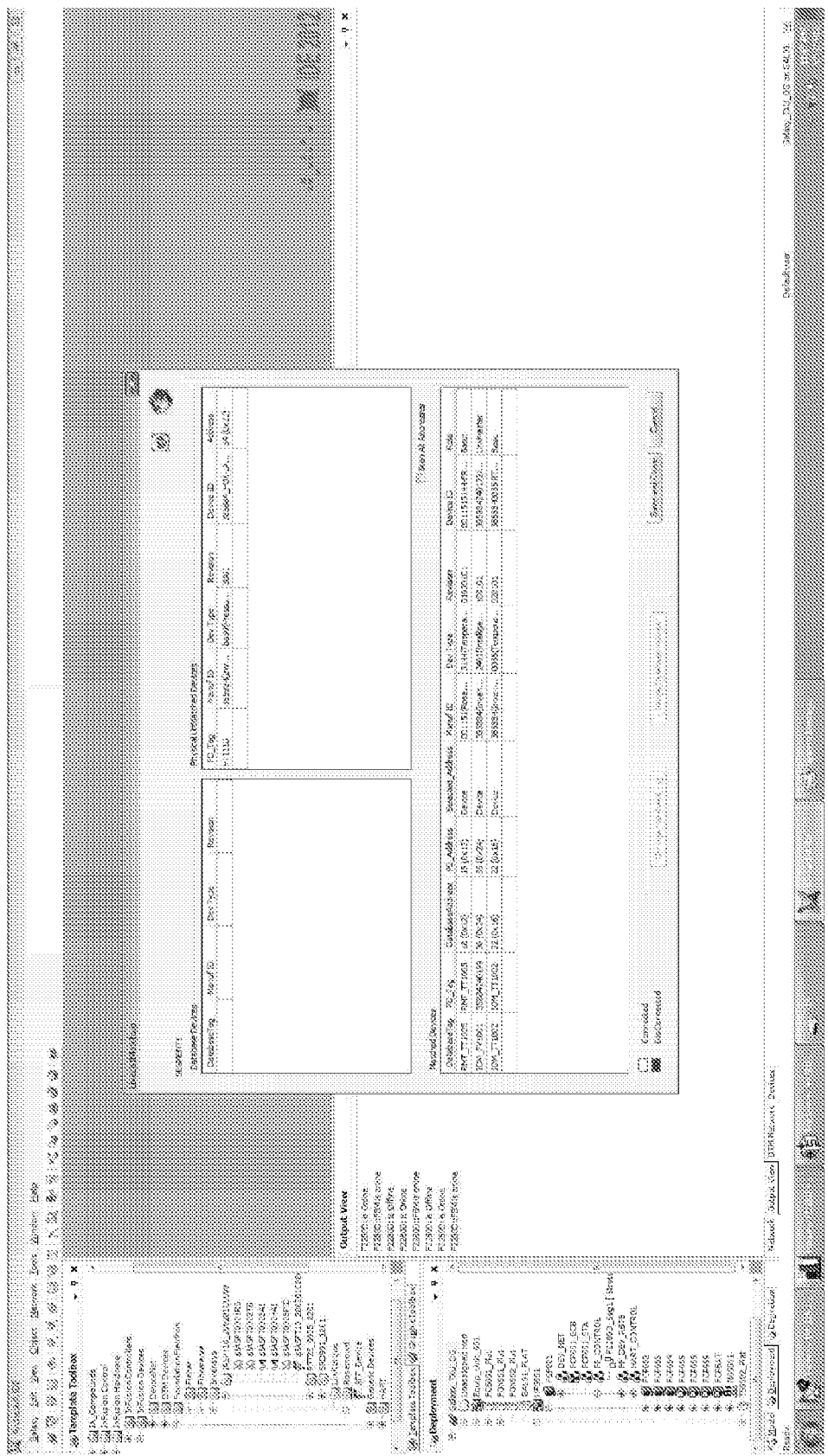
FIG. 2B-2D illustrate exemplary user interface screenshots of an application for identifying and matching the attached devices via an automated process that optionally includes supplementary user-entered information, according to aspects described herein.
Figure 2C:
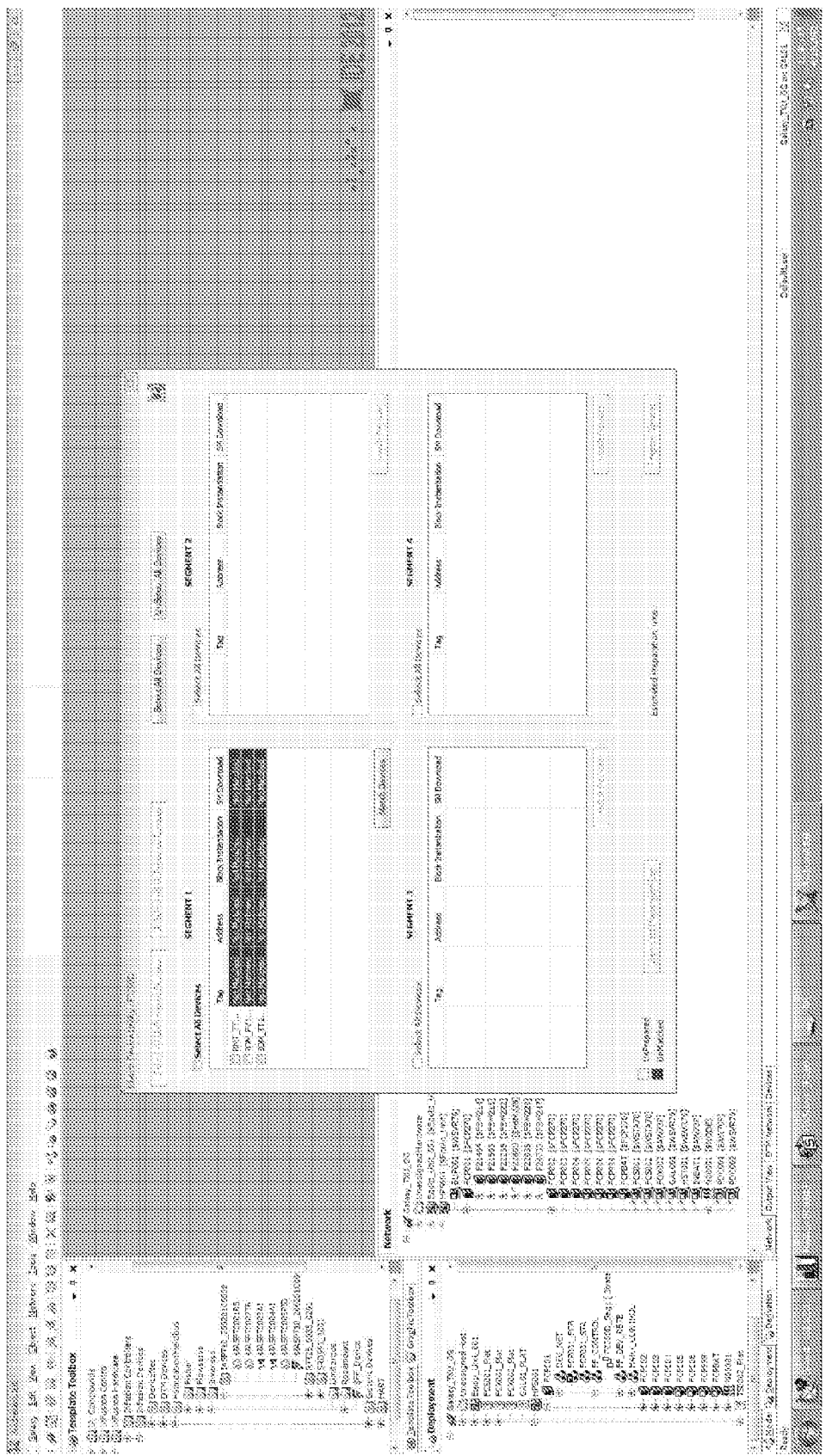
Figure 2D:
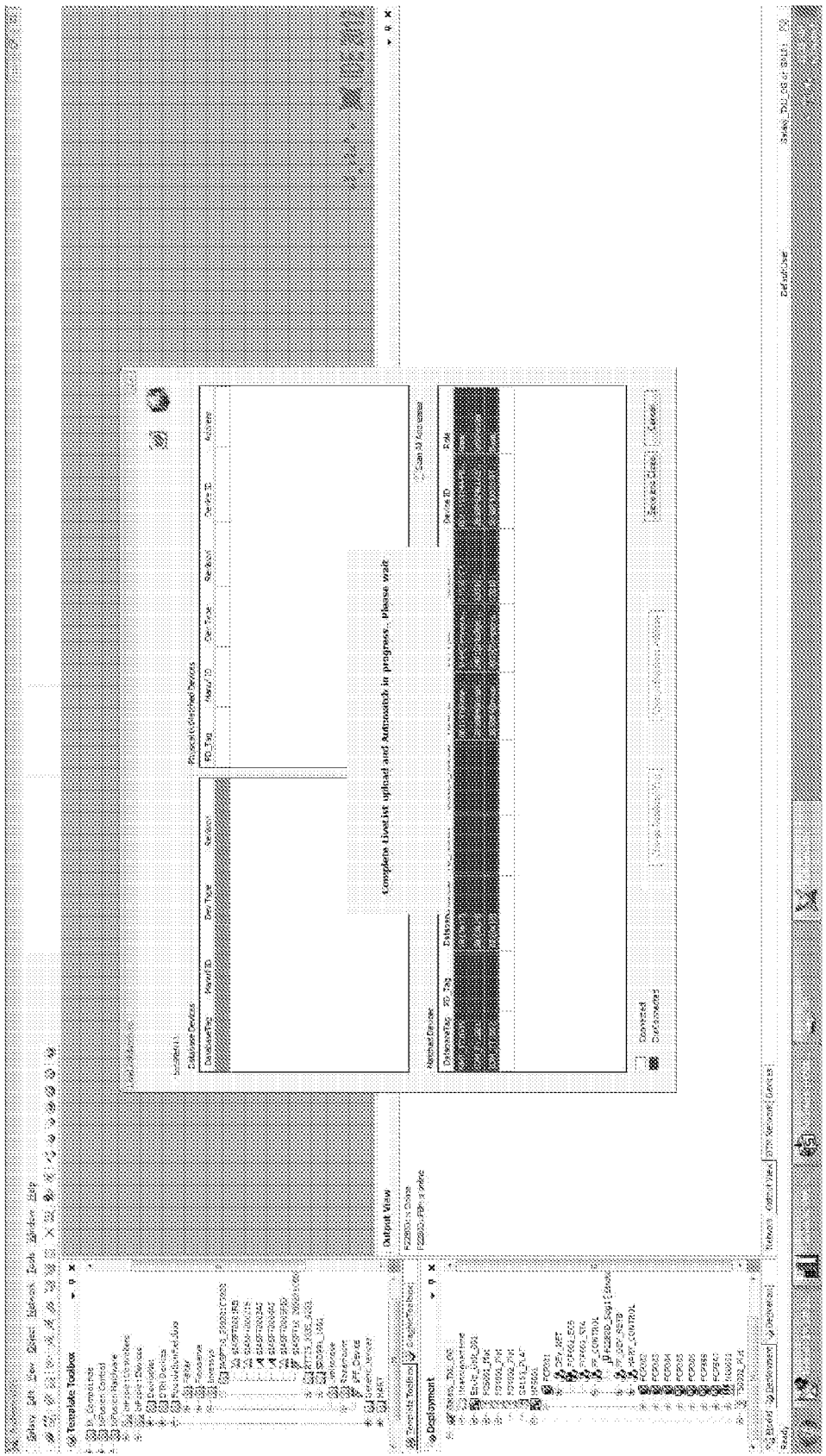

FIGS. 2B, 2C and 2D illustrate exemplary user interface screenshots of an application for identifying and matching the attached devices via an automated process that optionally includes supplementary user-entered information. In other words, each "marked" device is considered a "matched device" or a "matched field device" for purposes of device preparation. After initiating device commissioning, the process moves, at 207, to device preparation 210, which is described in greater detail below. Once the device preparation step completes, the process moves, at 212, to device operation 215 which is separate and distinct from device commissioning 205 and device preparation 210.

Figure 3A:
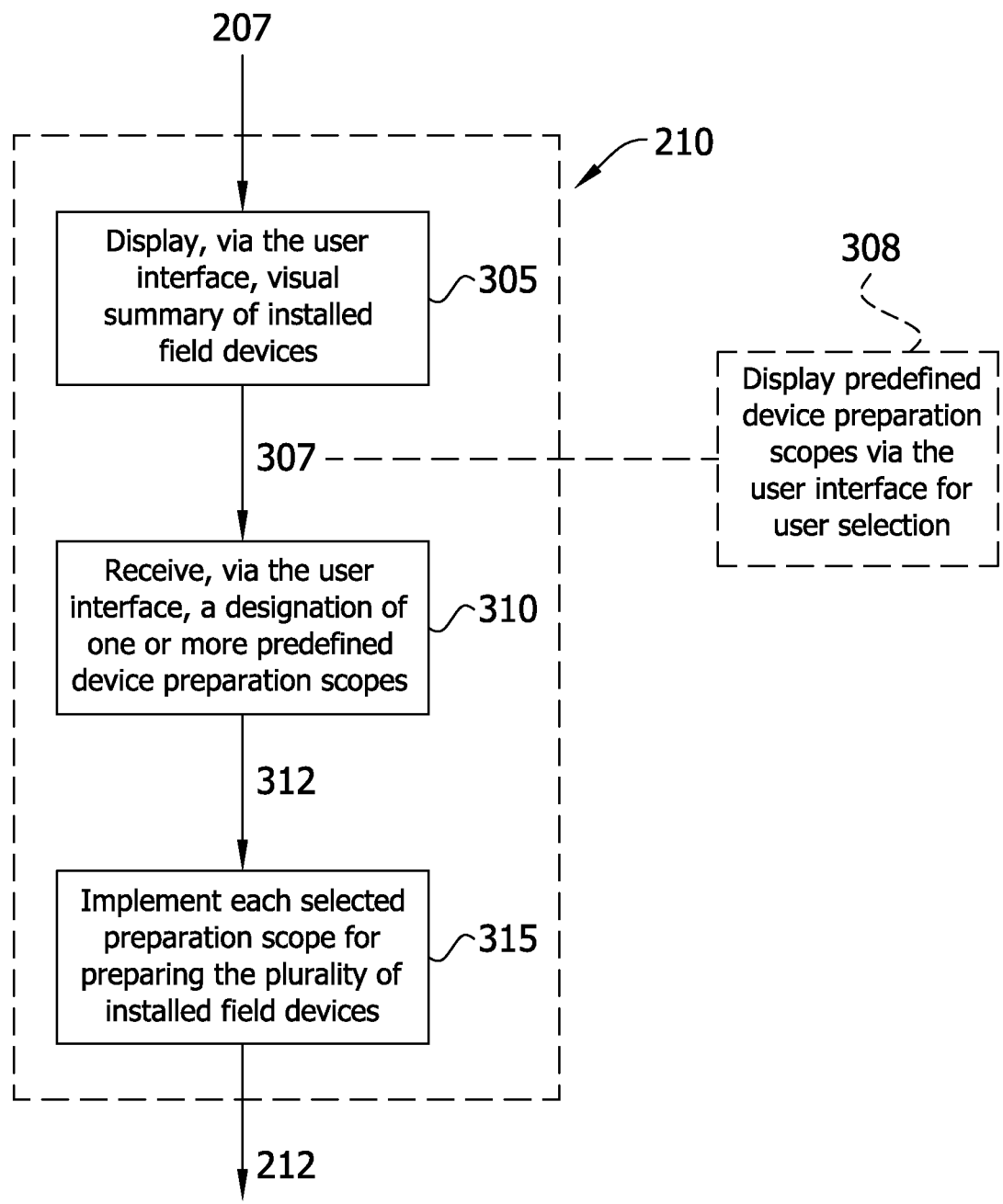
FIG. 3A illustrates an exemplary flow diagram of a device preparation process according to aspects described herein.
Figure 3B:
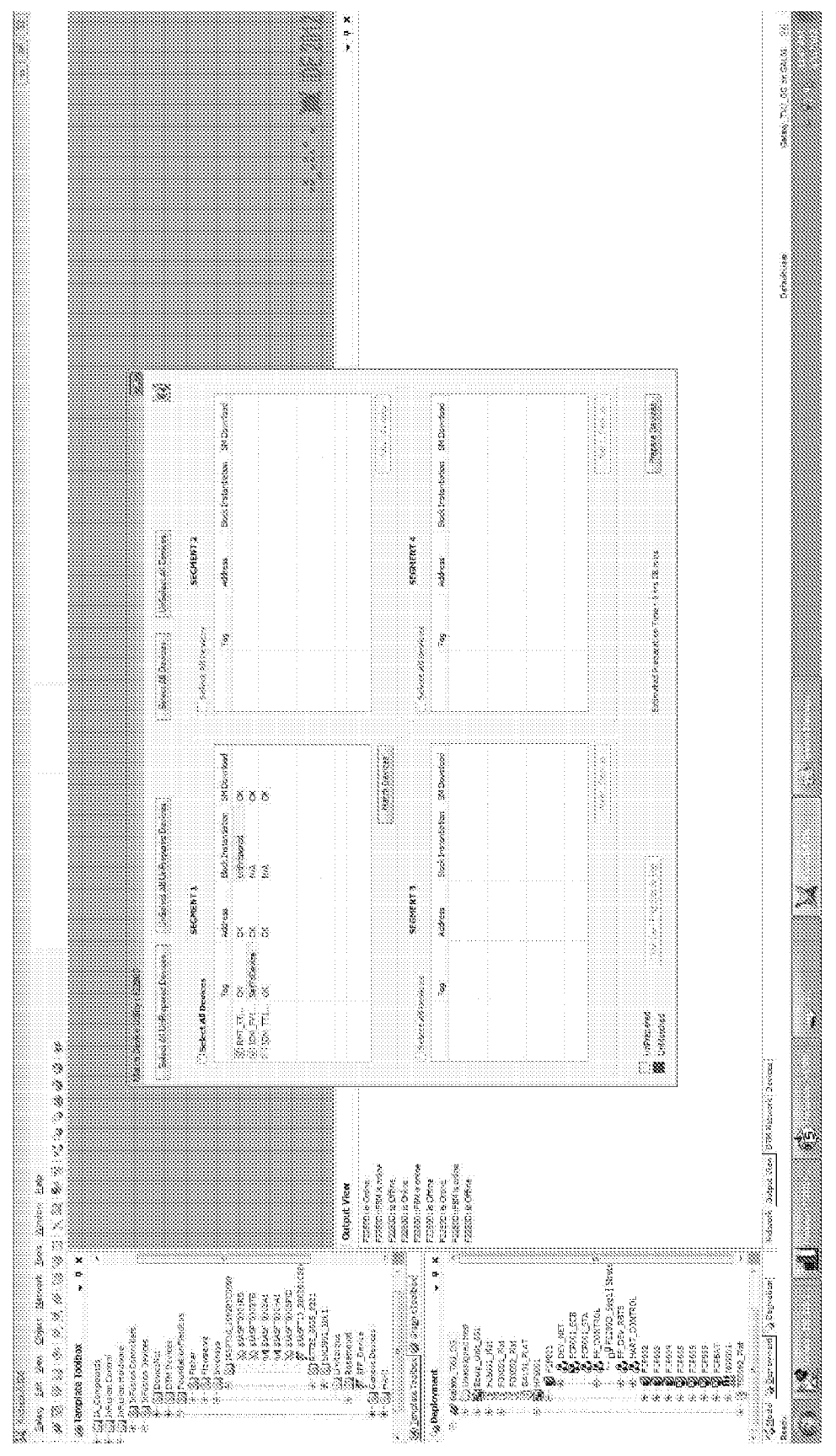
Figure 3C:
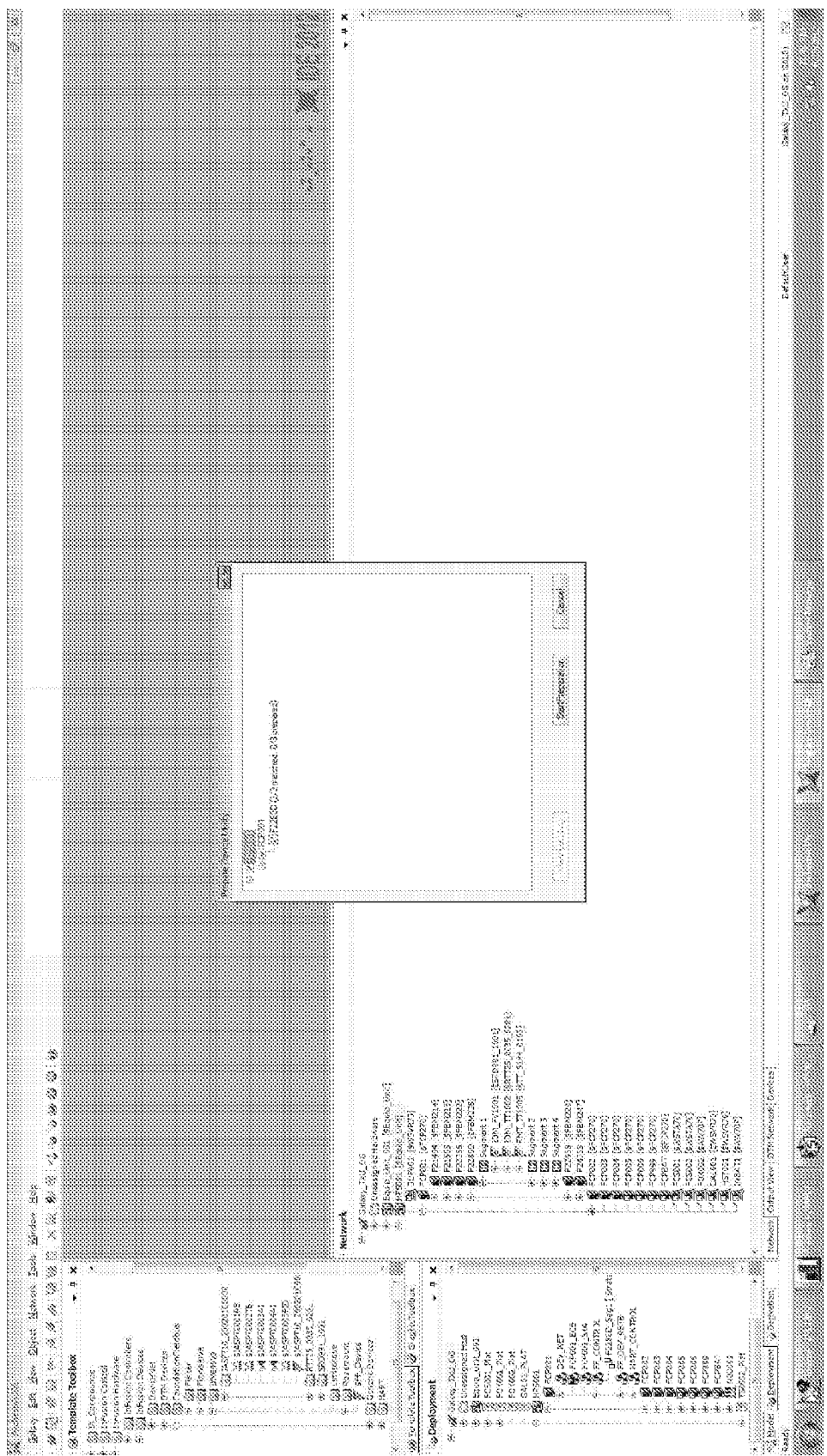
FIG. 3C is an exemplary user interface screenshot for starting device preparation according to aspects described herein.

FIG. 3A illustrates one embodiment of device preparation process 210. At 305, a visual summary of the installed field devices stored in the device database is displayed, by the computing device 135, in a user interface of a preparation utility, as illustrated in FIG. 3C and described below. In some embodiments, the preparation utility stores the address of each matched device and optionally, assigns the matched device a tagname. For example, the computing device 135 displays the user interface on a display device either physically attached to the computing device 135 or in wireless communication with the computing device 135. In some embodiments, the visual summary displays a list of device according to a scope or hardware "container" selected by the user.

A match utility, which is part of the overall preparation process, queries the instruments attached to the segment/FBM and uses matching rules to pair those instruments to the devices in the database. For example, the matching utility reads the existing tag and address and compares them to the database. Moreover, the match utility allows the user to choose to use a tag in the database or a tag on the actual instrument. In the match utility, the user can choose to keep the existing address of the device or change it to another address. The match utility also captures and stores the information, including the unique device identifier. This is the information from which the preparation utility works. And the match utility also feeds the information to the preparation utility indicating that the device is matched so that preparation can proceed. The prep utility bypasses preparation of any device that has not had a match from actual device to database.

FIG. 3B illustrates an exemplary user interface screenshot, with the user selecting two matched devices in "SEGMENT 1" for device preparation 210. In some embodiments, the visual summary displays a preparation status for each matched device. In this manner, the user interface allows the user to establish that a real device in the plant is the same as a device that was previously user-configured into the database. By way of example and not limitation, the preparation status includes one of a "prepared" status, a "ready-to-prepare status, and a "not-ready-to-prepare" status. In this example, a "prepared" status indicates that the device was successfully prepared the last time the user executed the preparation step, while a "ready-to-prepare" status generally indicates that a newly matched device that has not yet been prepared. The "not-ready-to-prepare" status may indicate that a match has not been made between the attached device and the device database. In some embodiments, the "not-ready-to-prepare" status may indicate that the device is being currently being commissioned or is not otherwise in a state that allows the device to be prepared. In some embodiments, the preparation status includes a "failed-to-prepare" status, which generally indicates that a previous attempt to prepare the device failed during the process. The "failed-to-prepare" status may indicate, among other things, that the device experienced an error or failure that requires correction before the device can be prepared.

In some embodiments, the user interface displays, at 307, the one or more predefined device preparation scopes stored in the configuration database 130 for user selection 308. As noted above, each predefined device preparation scope indicates one or more installed field devices for preparation. The user then selects or otherwise provides, at 310, one or more of the predefined device preparation scopes to indicate which of the installed field devices the user wants to prepare for operation. In some embodiments, the one or more stored predefined device preparation scopes indicate one or more FBMs and/or other network interfaces connected to the communication network, which in turn indicates the installed field devices attached thereto. In some embodiments, the user interface displays a first visual indicator for each displayed field device, such as highlighting the displayed field device, to indicate that one or more of the selected preparation scopes includes the displayed field device. In some embodiments, the user interface displays a second visual indicator indicating which of the indicated field devices, if any, are not ready to be prepared.

Once the user is ready to initiate the device preparation process, at 312, the user selects the appropriate user interface elements. For example, the user clicks on the "Prepare Devices" user interface button in FIG. 3B and then "Start Preparation" in FIG. 3C to prepare the selected devices. In response, the user computing device 135 implements, shown at 315 in FIG. 3A, each device preparation scope selected by the user for updating the configuration of each installed field device indicated by the selected device preparation scopes.

Figure 4A:
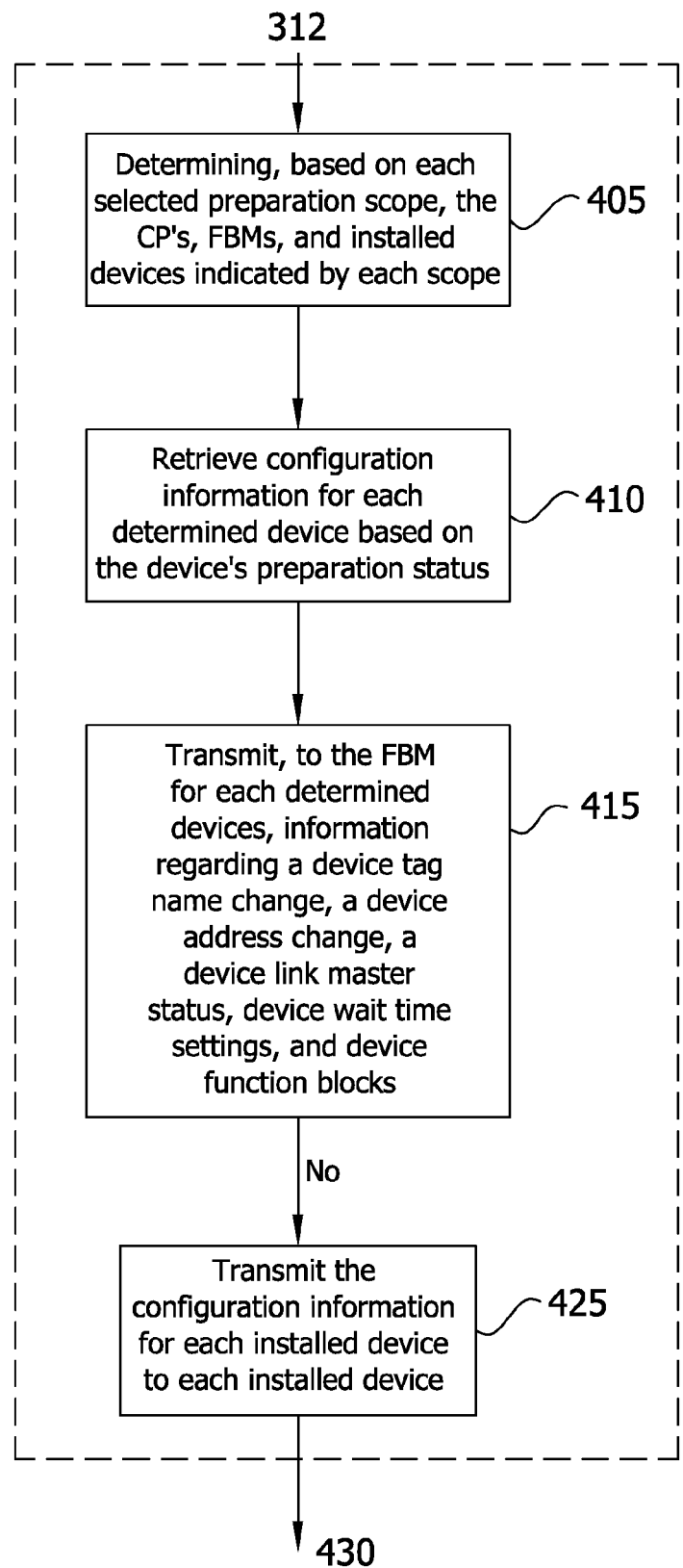
FIG. 4A illustrates an exemplary flow diagram for an implementation process using predefined device preparation scopes as identified in FIG. 3, according to various aspects described herein.

FIG. 4A further illustrates one example of an implementation process indicated at 315. At 405, the computing device 135 determines, based on each selected device preparation scope, the installed field devices indicated by each scope. Then at 410, the computing device 135 retrieves configuration information from the configuration database 130 for each determined device based on the preparation status of the device. For example, the parameter settings for device system management, such as the System Management Information Base (MIB) parameters specified by the Fieldbus Foundation specification. are retrieved. The retrieved parameters include timeout parameters (e.g., T1, T2, and T3) for various system transactions with the device. Other system management behavior of the device, which is set to a Link Master Device or a Basic Device, is passed through a block, called an Equipment Control Block (ECB). The ECB is loaded into the CP and there is one ECB for each fieldbus instrument. Further to the example, the match utility used before preparation displays if the system needs to change the device from the setting called Basic to the setting called Link Master. Generally at the end of preparation, the FBM writes the information from the ECB into the device.

The computing device does not retrieve configuration information for those devices previously identified as "not ready" for preparation, i.e., the computing device 135 avoids inefficiency and reduces processing time by retrieving information for only those devices that are ready for preparation and operation. The computing device 135 next, at 415, transmits, to the FBM for each installed field device, information the FBM may need to prepare the device. For example, the information may include, but is not limited to, information regarding for changing the device tag name, changing the device address, setting a device link master status, changing one or more device communication wait time settings, and/or instantiating one or more device functions blocks in the device. In the event any or all information on the device is already correct, the FBM may, as appropriate, skip or otherwise not perform one or more of the steps. In an embodiment, the user chooses the device address in the match utility. The user can either accept the address of the actual device, so it gets uploaded and saved into the device database records, or the user can pick or type in an address and, during preparation, the prep utility will write/change the address in the device. The tagname is handled in much the same manner as the address. If the user wants to change the tagname, the prep utility changes it when the device is processed.

Figure 4B:
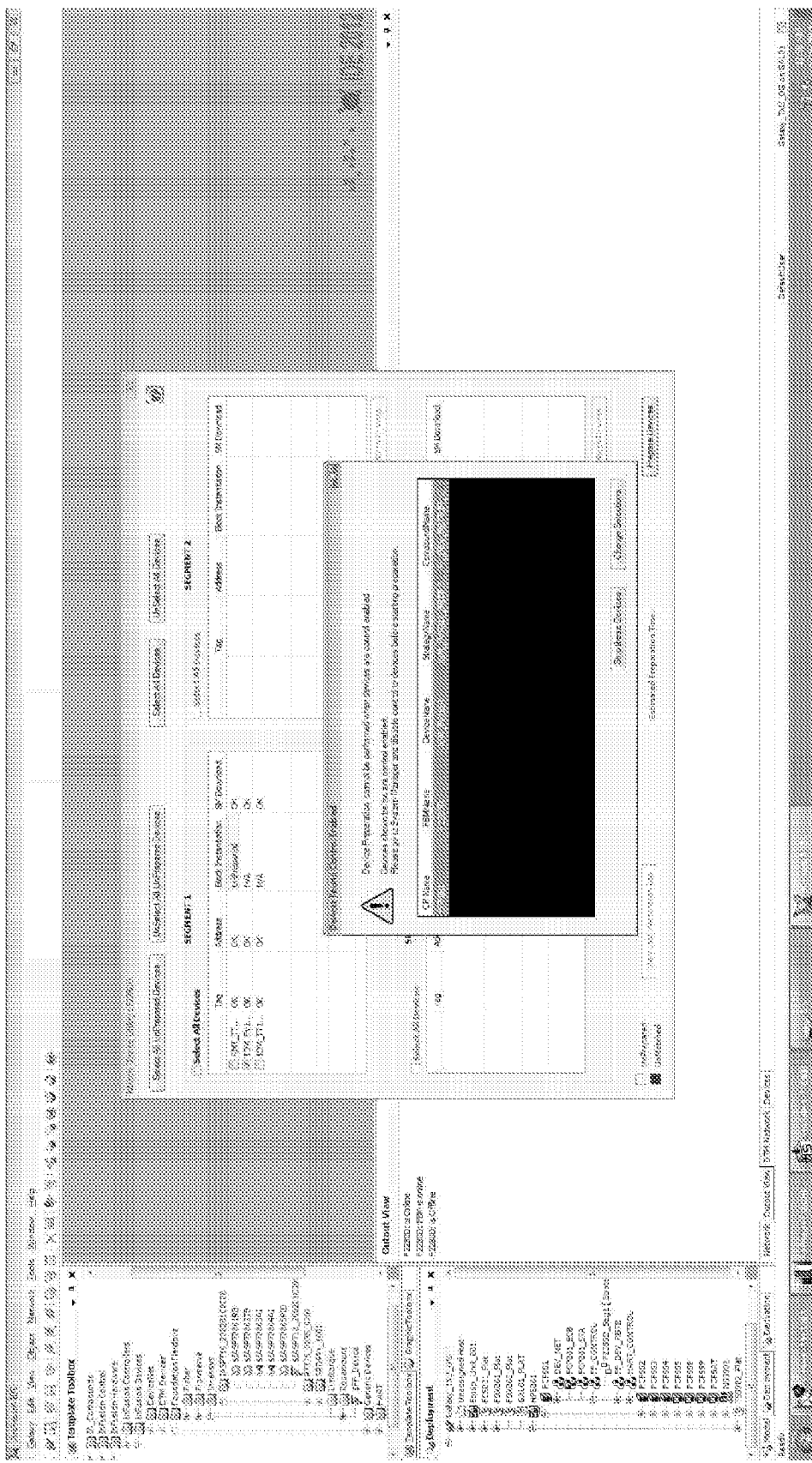
FIG. 4B illustrates an exemplary screen shot of a user interface indicating which devices cannot be prepared to a "control enabled" state according to various aspects described herein.
Figure 4C:
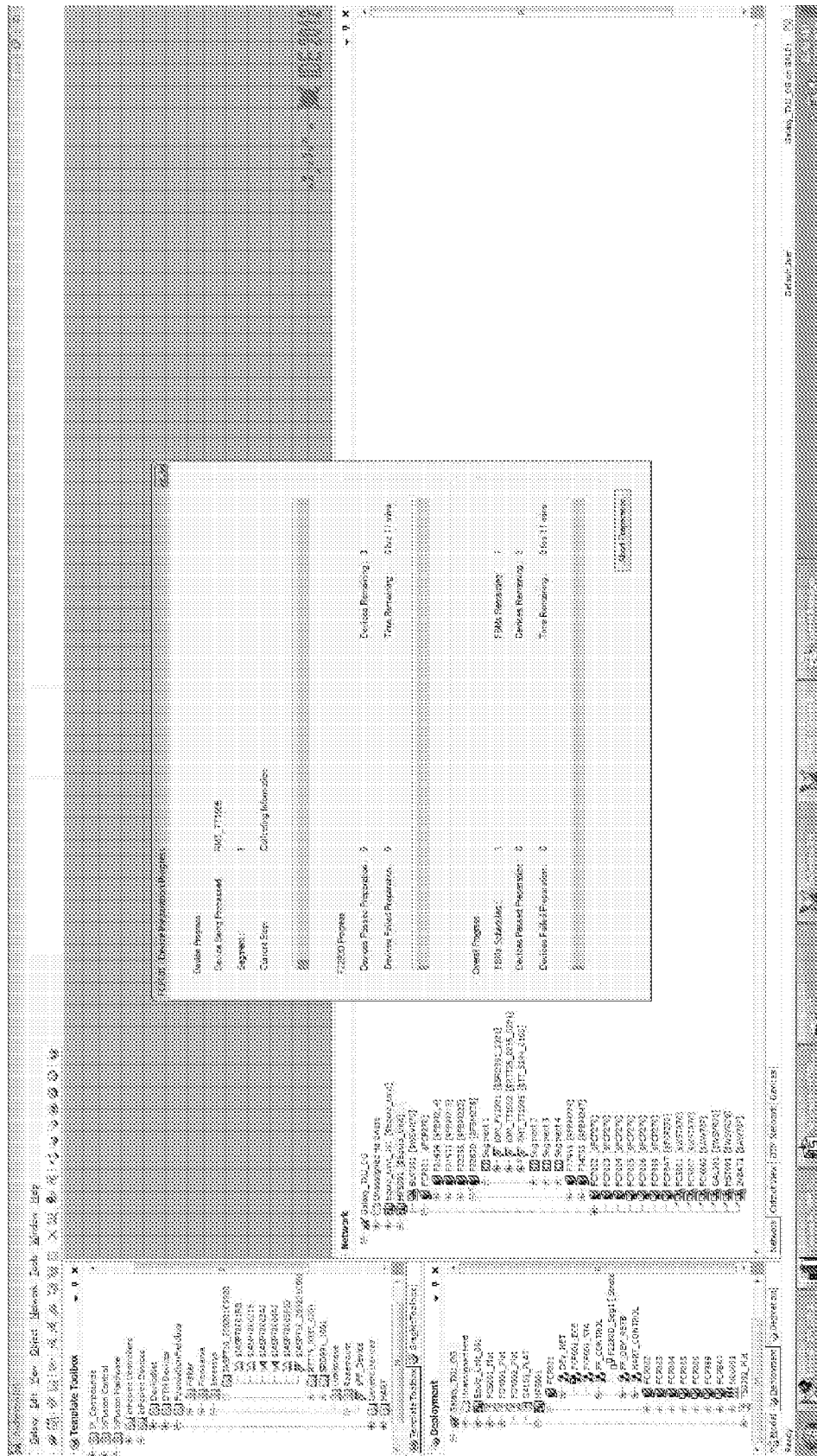
FIGS. 4C-4F illustrate exemplary screen shots of a user interface that includes a progress bar indicating the relative completion of the preparation process and/or a estimated time to complete the preparation process, according to various aspects described herein.
Figure 4D:
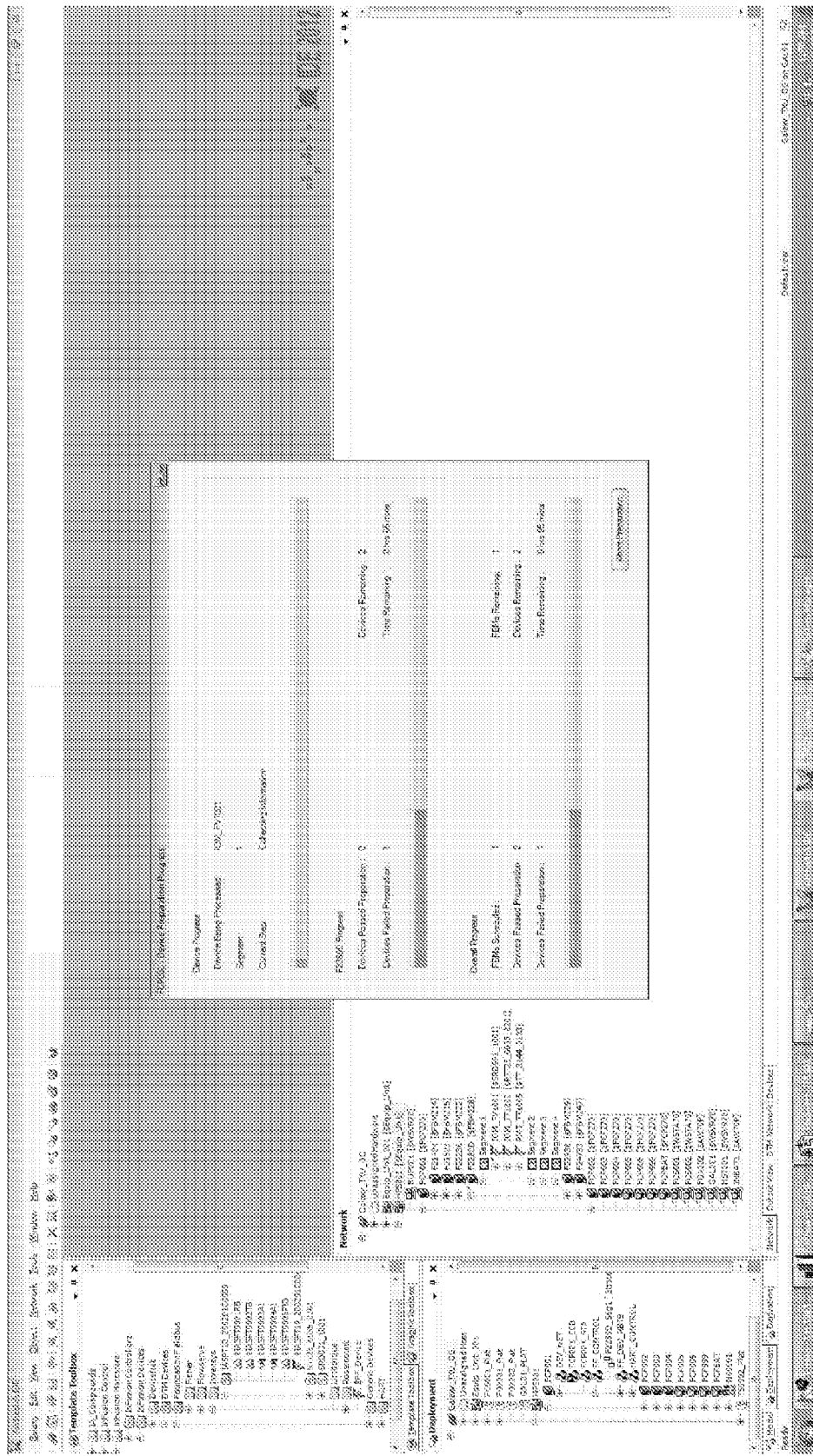
Figure 4E:
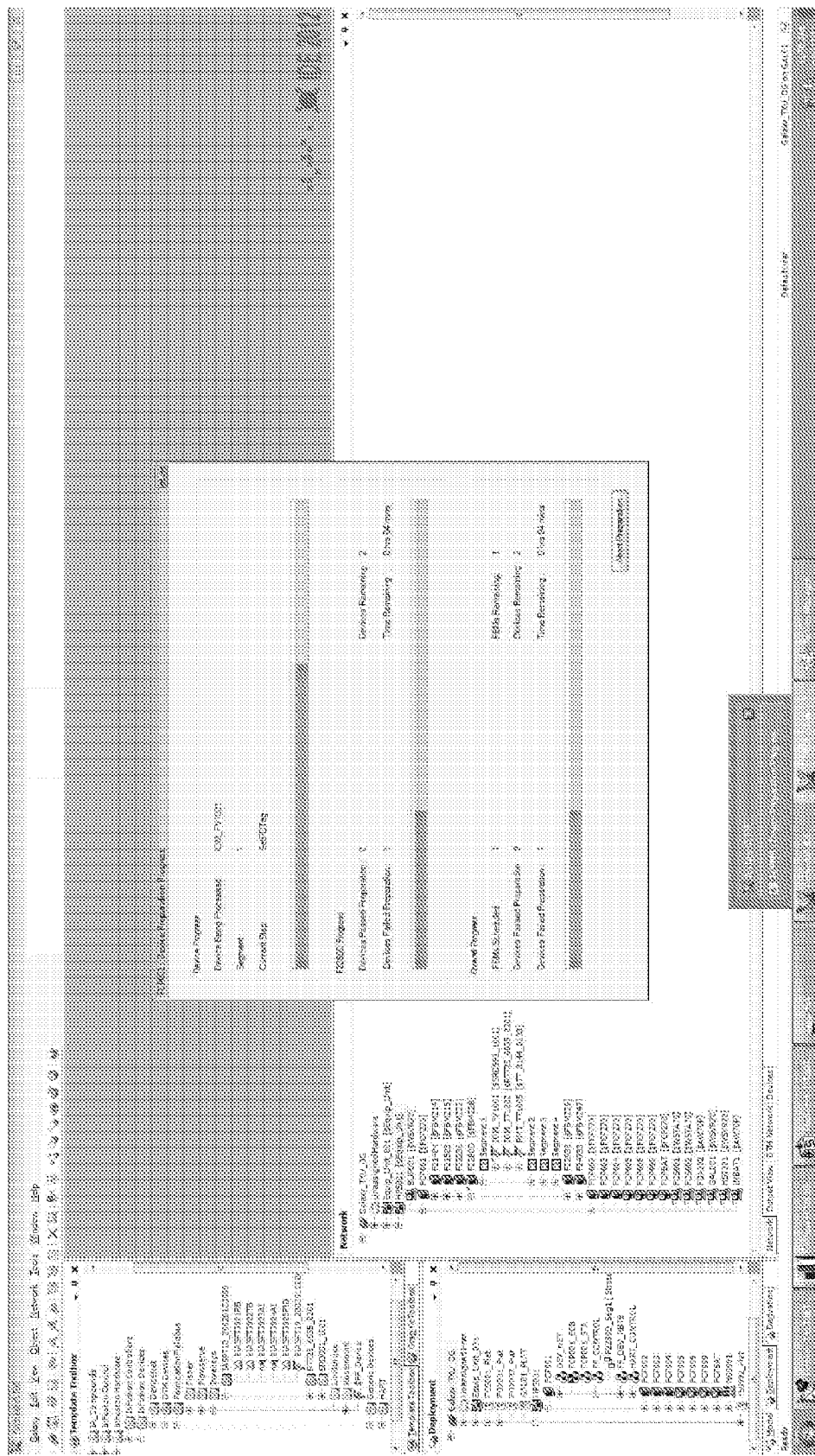
Figure 4F:
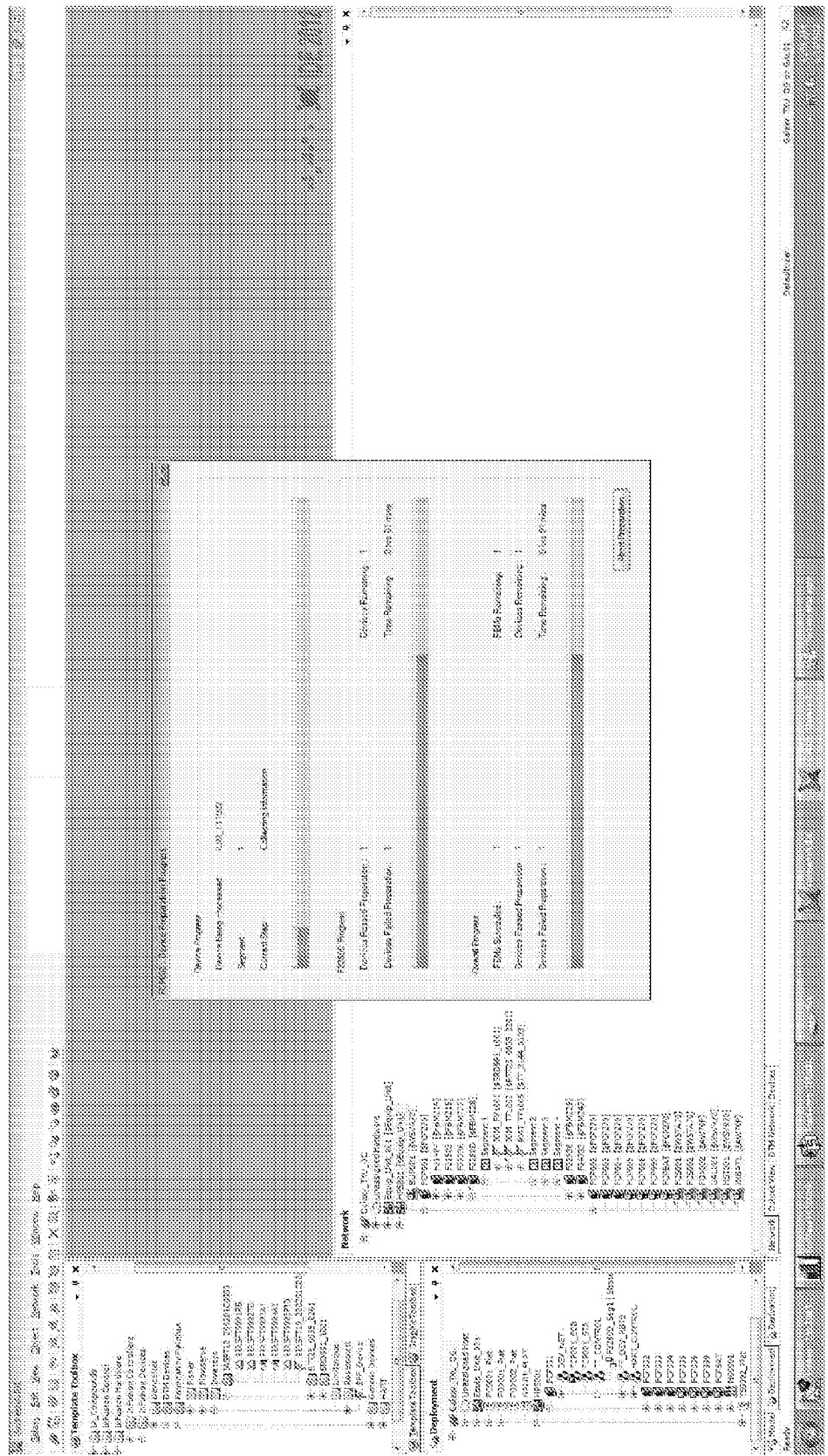

In an embodiment, the computing device 135 may determine that one or more installed field device cannot be prepared, e.g., the devices are already enabled for control or otherwise in the state that prevents the devices from being prepared. FIG. 4B illustrates an exemplary screen shot of a user interface indicating which devices cannot be prepared to a "control enabled" state. The exemplary user interface permits the user to select either "Skip these Devices" or "Change Selections". The computing device 135 then, at 425, transmits the configuration information for each installed field device to each installed field device for updating the configuration of the device for continued operation. In an embodiment, updating includes changing tags by way of a dedicated command as specified in Foundation Fieldbus specifications. The command is a unique and explicit command that instructs the device to change its tag to a string specified in the command message. Thus, in this embodiment, updating encompasses more than simply setting a parameter. It causes numerous internal actions within the device separate from the tag change command.

And in an embodiment, the user interface includes a progress bar indicating the relative completion of the preparation process and/or an estimated time to complete the preparation process, as illustrated in the exemplary screen shots in FIGS. 4C-4F.

Advantageously, the simultaneous transmission of configuration information for the installed field devices can greatly reduce the amount of time required to prepare a number of installed field devices. The simultaneous transmission of configuration information permits each device to be configured for operation in parallel, as opposed to retrieving the configuration information for a single matched device, transmitting the configuration information for the matched device to configure myself, and then repeating the process for each additional matched device. In some embodiments, even greater efficiency from parallel processing is achieved by "batching" the configuration information for installed field devices together in one or more batches, where each batch corresponds to one or more installed field devices operatively connected to the same FBM, an example of which is illustrated by the exemplary process control network in FIG. 5.

Figure 5:
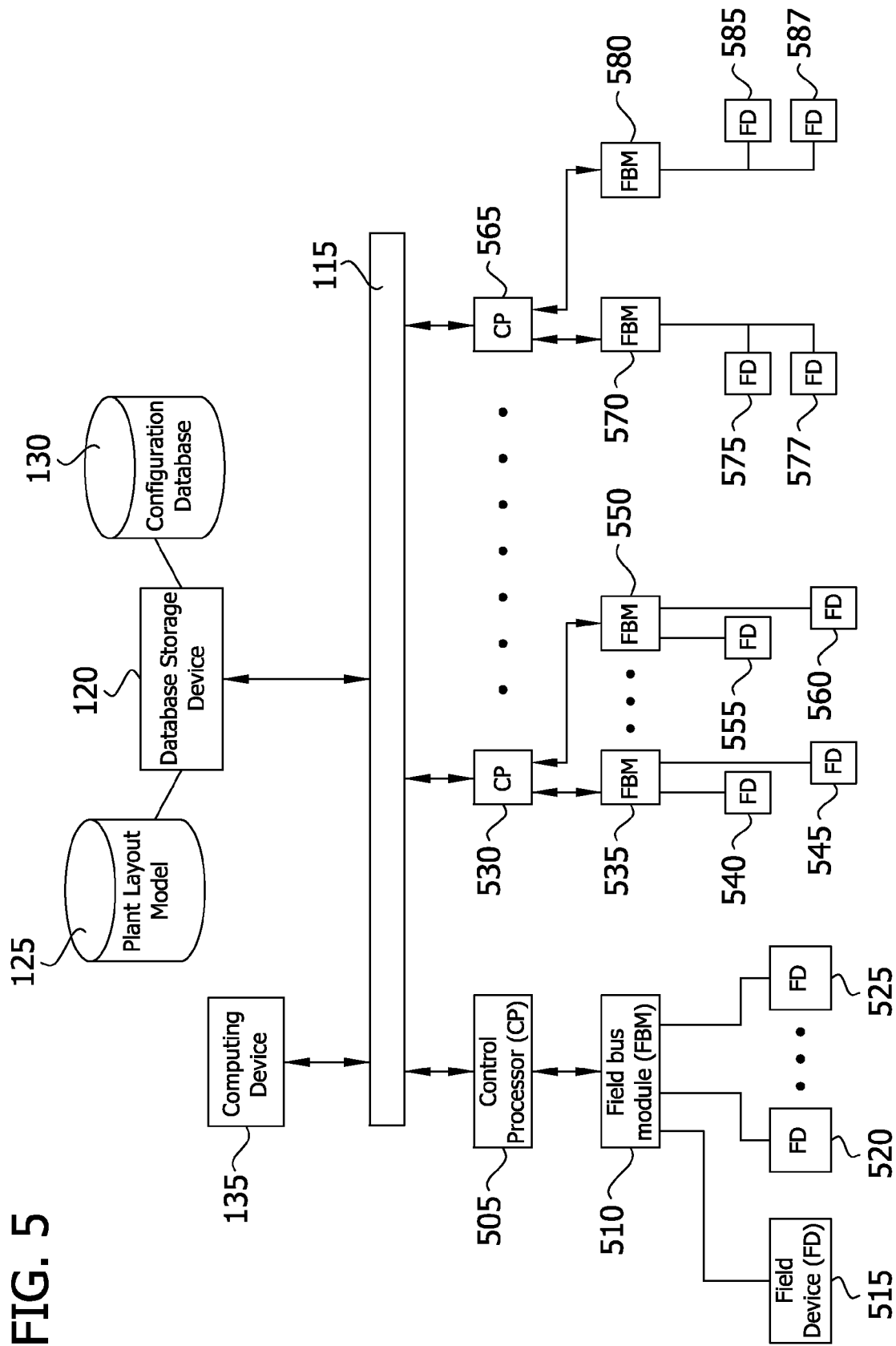
FIG. 5 illustrates another exemplary process control network according to various aspects described herein.

In FIG. 5, the database storage device 120 (storing the plant layout model 125 and the configuration database 130) and the computing device 135 are operatively connected to communication network 115. A control processor ("CP") 505 operatively connects to the communication network 115 and also operatively connects to field bus module ("FBM") 510. As illustrated in FIG. 5, field devices ("FD") 515, 520 and 525 operatively connect to FBM 510. In this example, the devices have already been commissioned and installed on the process control network, such that the plant layout model reflects the installed field devices and their respective locations in the network, e.g., in the hierarchical mode, the FD 515 is a "child" of the FBM 510, and the FBM 510 is a "child" of the CP 505. The exemplary process control network in FIG. 5 further includes the CP 530, which operatively connects to the communication network 115 and operatively connects to the FBM 535, which in turn operatively connects to FD 540 and FD 545. Similarly, the CP 530 operatively connects to the FBM 550, which in turn operatively connects to FD 555 and FD 560. In FIG. 5, the CP 565 operatively connects to the communication network 115 and operatively connects to FBMs 570 and 580, e.g., by way of a multi-drop communication network, which in turn operatively connects to FDs 575, 577 and 585, 587, respectively. As an example, each of the FBMs 570, 580 handles up to four multi-drop segments and each of the multi-drop segments connects up to 16 field devices.

With respect to FIG. 5, the exemplary process described above and illustrated in FIGS. 2-4F proceed generally as indicated. In one embodiment, transmitting configuration information to each matched device occurs by batching the configuration information and then transmitting the batch to the appropriate CPs and/or FBMs. For example, a batching process may batch configuration information for installed field devices indicated by the user-selected device preparation scopes. For example, the computing device 135 in FIG. 5 determines a first batch for the CP 505 with configuration information for FDs 515, 520 and 525, a second batch for the CP 530 with configuration information for FDs 540, 545, 555 and 560, and a third batch for the CP 565 with configuration information for FDs 575, 577 and 585, 587. The computing device next transmits each batch to its corresponding CP, where each CP can further distribute configuration information to each appropriate FBM for transmission to the FD. In other words, the CPs and the FBMs implement the user-selected device preparation scopes using their respective computer processors. By operating in this manner, each CP operates in parallel with the other CPs to minimize the amount of time needed to prepare the nine installed field devices. Furthermore, each FBM connected to a CP operates in parallel with the other FBMs connected to that CP, which also reduces the total amount of time required to prepare the installed field devices.

In some embodiments, a FBM monitors the configuration information of any FD operatively connected to it. In the event the FBM receives configuration information for a FD, the FBM compares the received configuration information to the monitored configuration information. If the information is duplicative, the FBM does not transmit the received configuration information to the FD, thereby eliminating an unnecessary field device update to maintain and/or improve overall process control network efficiency.

It should be noted that FIG. 5 illustrates but one example of a process control network within the scope of the present invention. Other exemplary process control networks, not illustrated or expressly described herein, remain within the scope of the present invention. As such, FIG. 5 is provided by way of example and not limitation.

Figure 6:
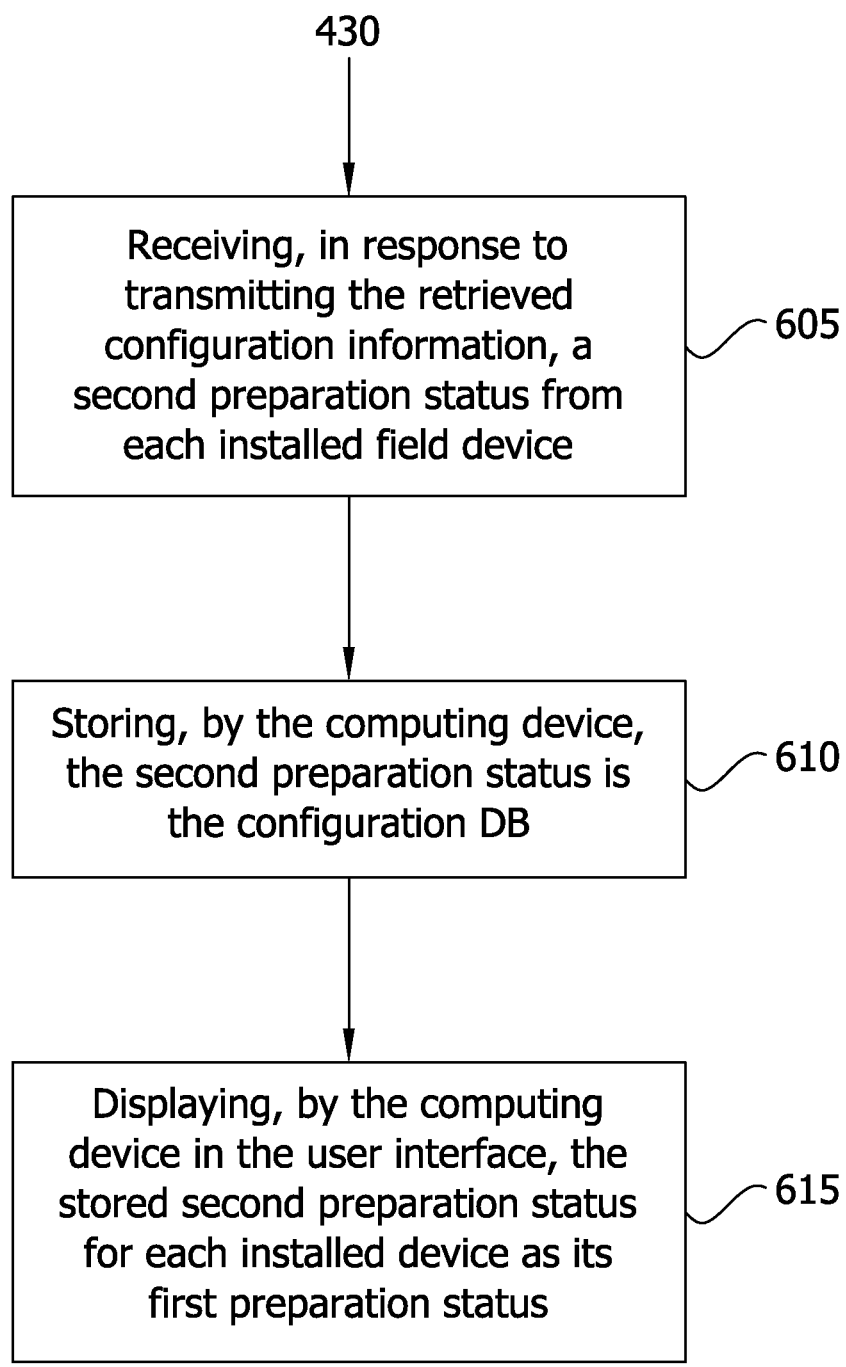
FIG. 6 illustrates an exemplary flow diagram for receiving a preparation status from a matched device during the preparation process according to various aspects described herein.

Turning now to FIG. 6, in one embodiment, the computing device 135 receives, in response to transmitting the retrieved configuration, a second preparation status from each corresponding installed field device at 605. The second preparation status includes, but is not limited to, one of a prepared status or a failed-to-prepare status. The second preparation status is thereafter stored, at 610, in the configuration database 130. In some embodiments, the computing device 135 displays, at 615, the status of this previous preparation attempt as the displayed first preparation status in the user interface. In this manner, the user is apprised not only of the device's ready/not-ready-to-prepare state in the displayed visual summary, but is also made aware of the status of the previous preparation attempt.

Figure 7:
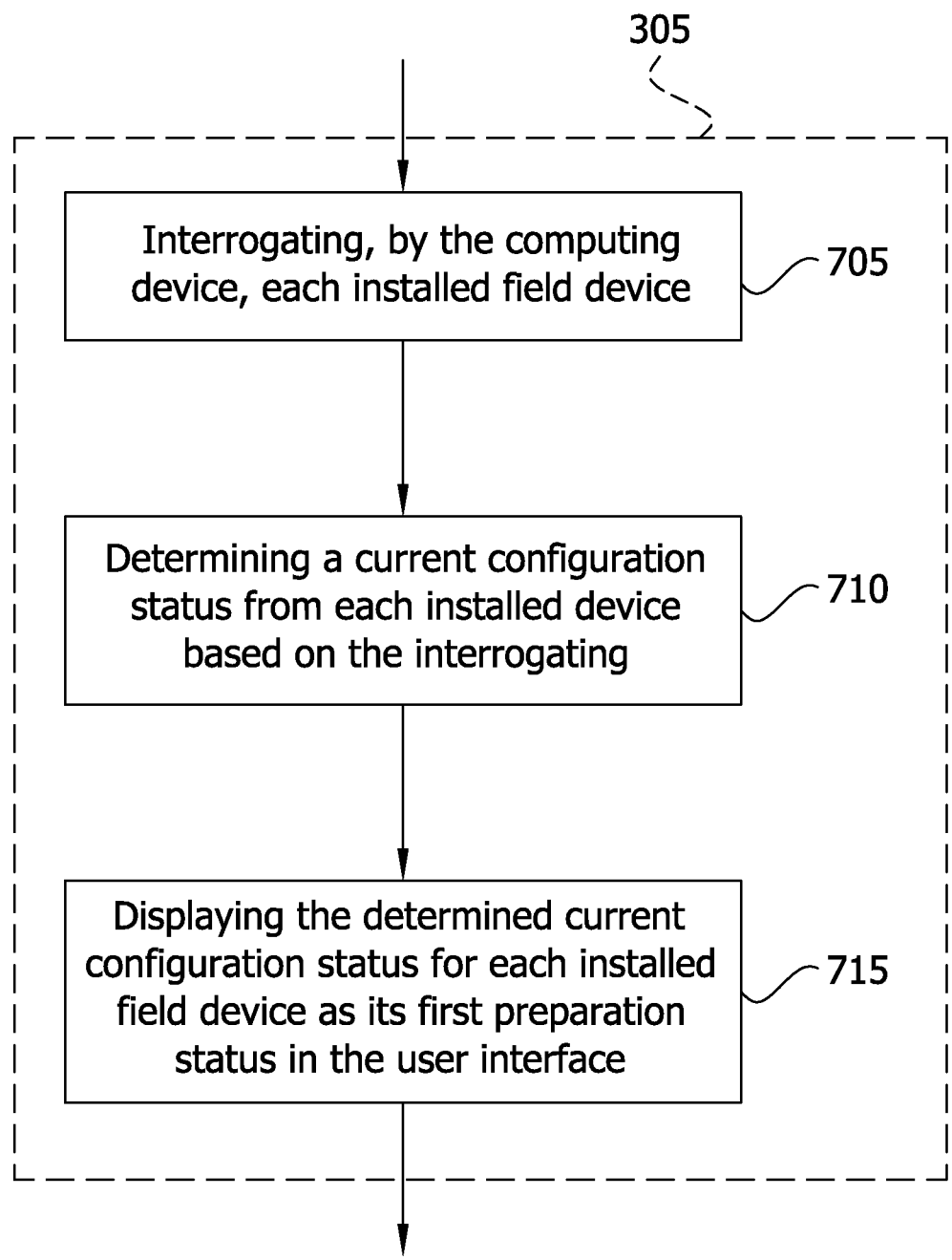
FIG. 7 illustrates an exemplary flow diagram for interrogating installed field devices according to various aspects described herein.

In other embodiments, the computing device 135 interrogates each installed field device for, among other things, displaying a visual summary of the installed field devices (step 305 in FIG. 3) including a current configuration status, as demonstrated in FIG. 7. In FIG. 7, the computing device 135 interrogates each installed field device at 705. The computing device determines a current configuration status, at 710, for each matched device based on the interrogation and then displays, at 715, the determined current configuration status for each installed field device as its first preparation status in the user interface. In some embodiments, the determined current configuration status for each installed field device is stored in the configuration database.

Figure 8:
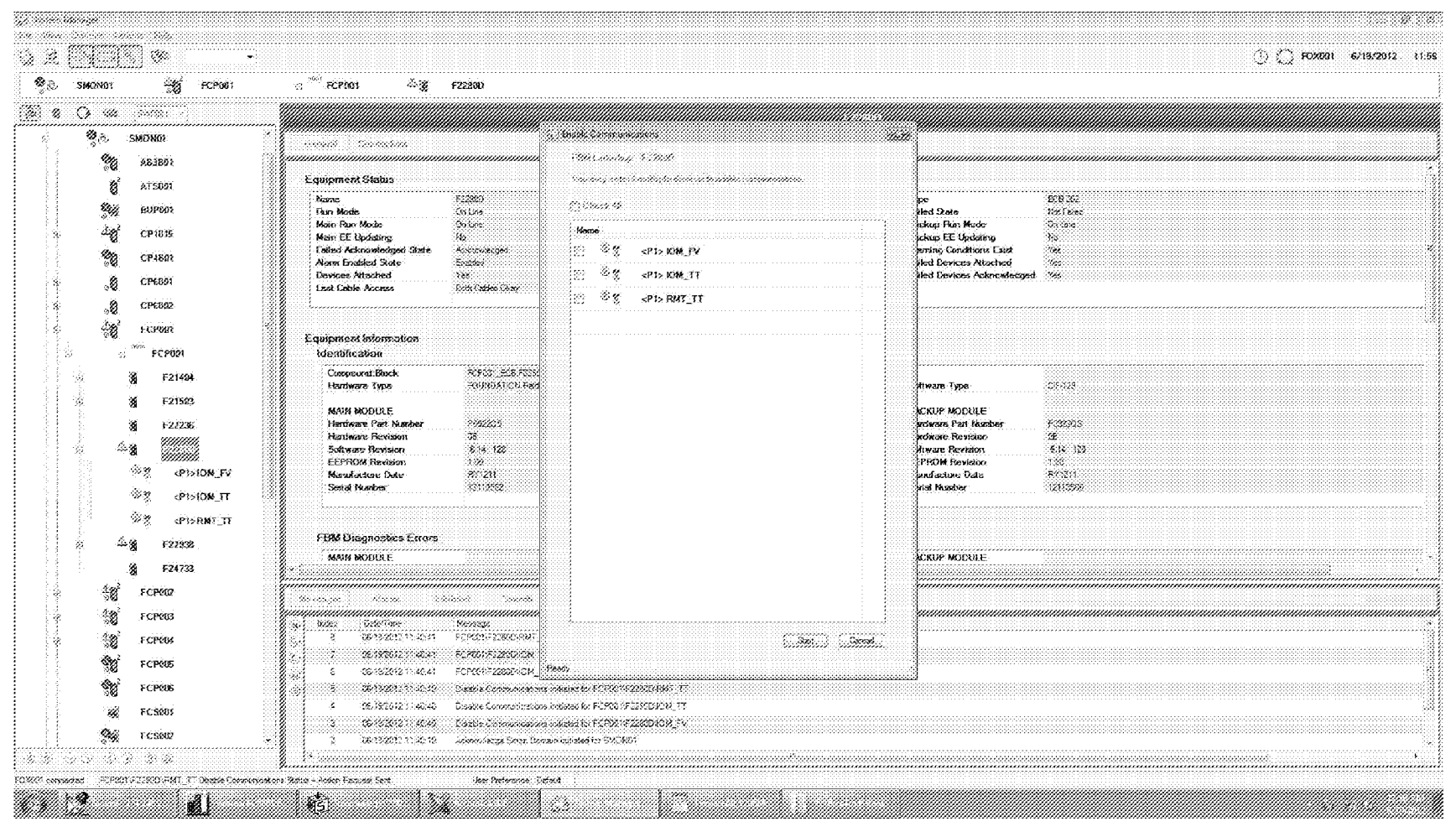

After the preparation process has been completed, as illustrated in FIG. 2-7, the user interface displayed by the computing device 135 permits the user to enable control of the prepared devices, as illustrated in the exemplary user interface in FIG. 8. In FIG. 8, the exemplary user interface displays the updated matched devices to the user. The computing device 135 then receives a user selection of one or more of the updated installed field devices for enabling control of those devices. The computing device then enables control of the updated installed field devices based on the received user selection. Enabling control of a matched device may include, but is not limited to, activating, at the FBM to which the device is attached, a schedule of published communication. This active communication allows for a "closed" control loop, e.g., a measurement is transmitted to a PID block, a desired valve positions is transmitted to an analog output block, and the valve moves to the desired position.

Figure 9A:
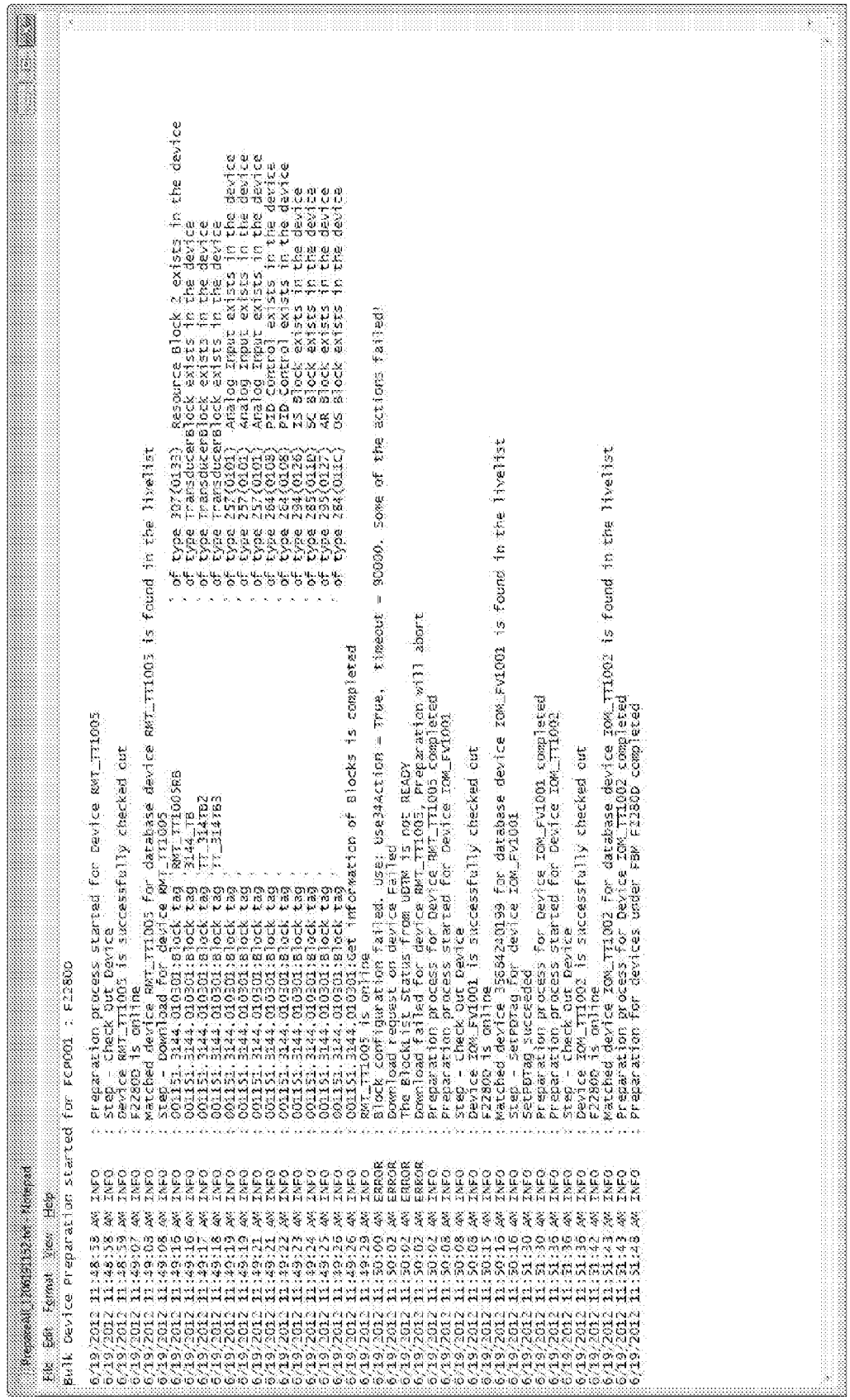
FIG. 9A illustrates an exemplary screen shot of the user interface displaying an execution log/summary results (e.g., work log/error log to identify errors in the previous preparation) according to various aspects described herein.
Figure 9B:
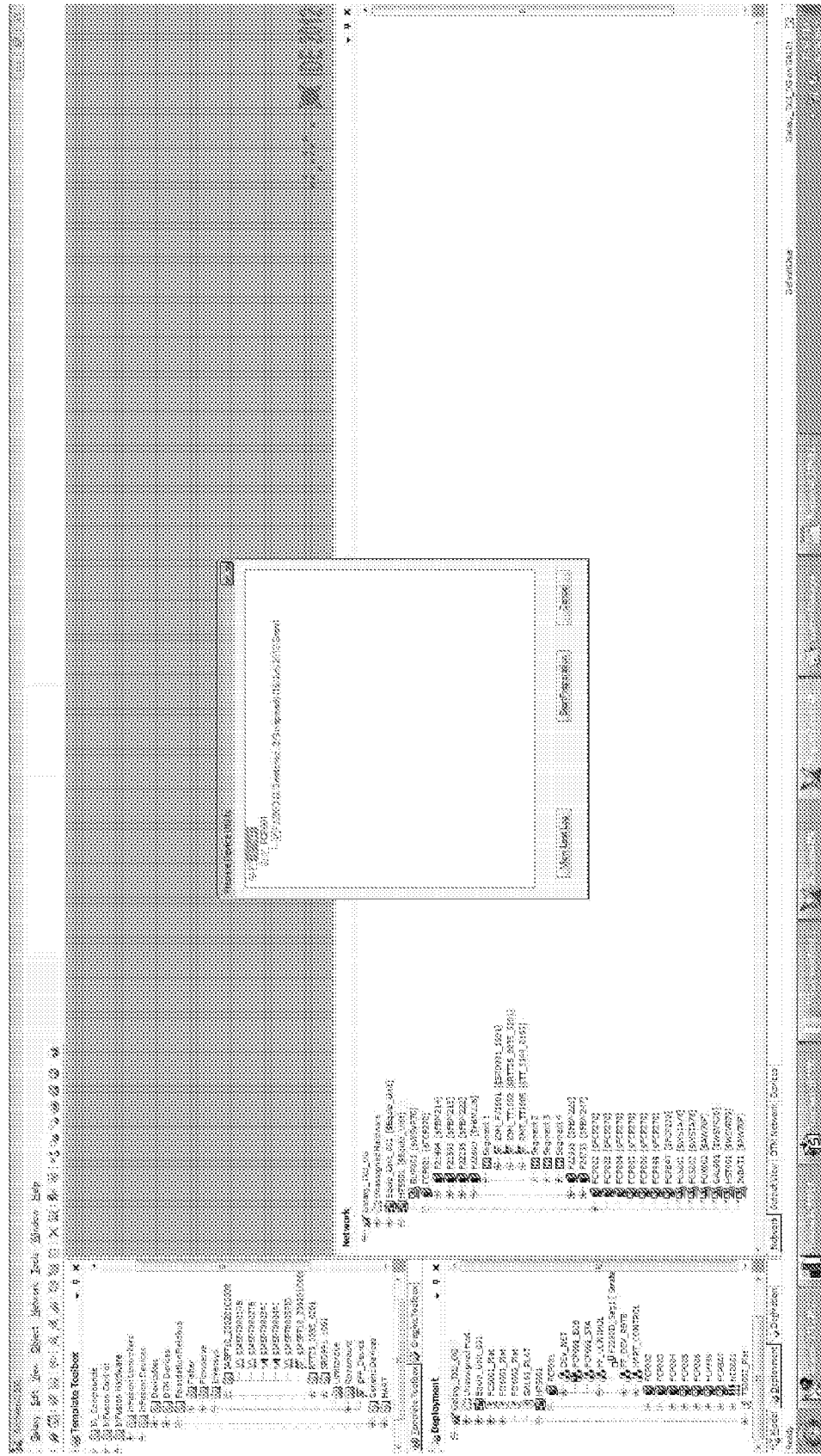
FIG. 9B-9D illustrates exemplary screen shots of the user interface displaying user-selectable elements for displaying the error log/preparation log according to various aspects described herein.
Figure 9C:
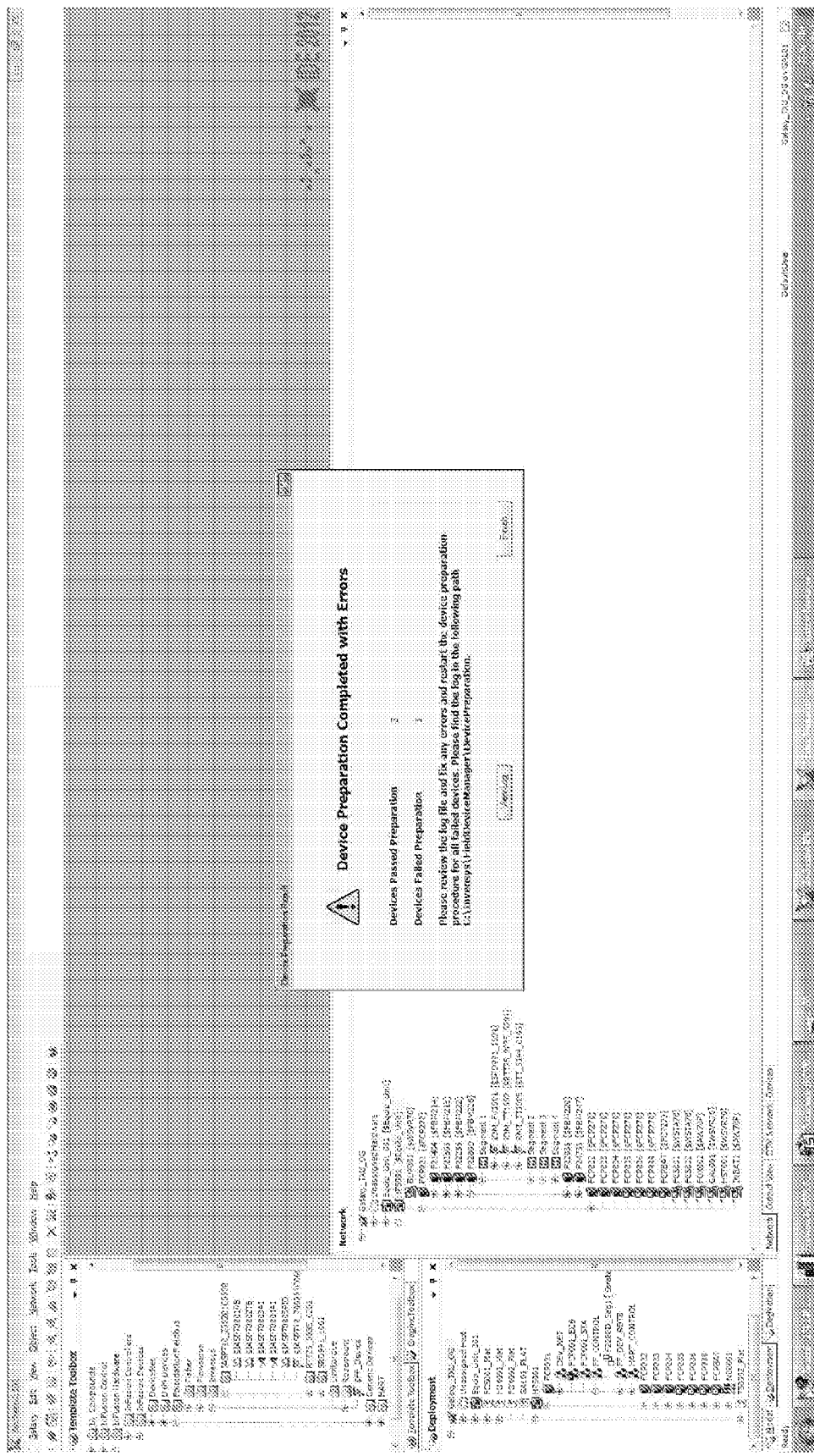
Figure 9D:
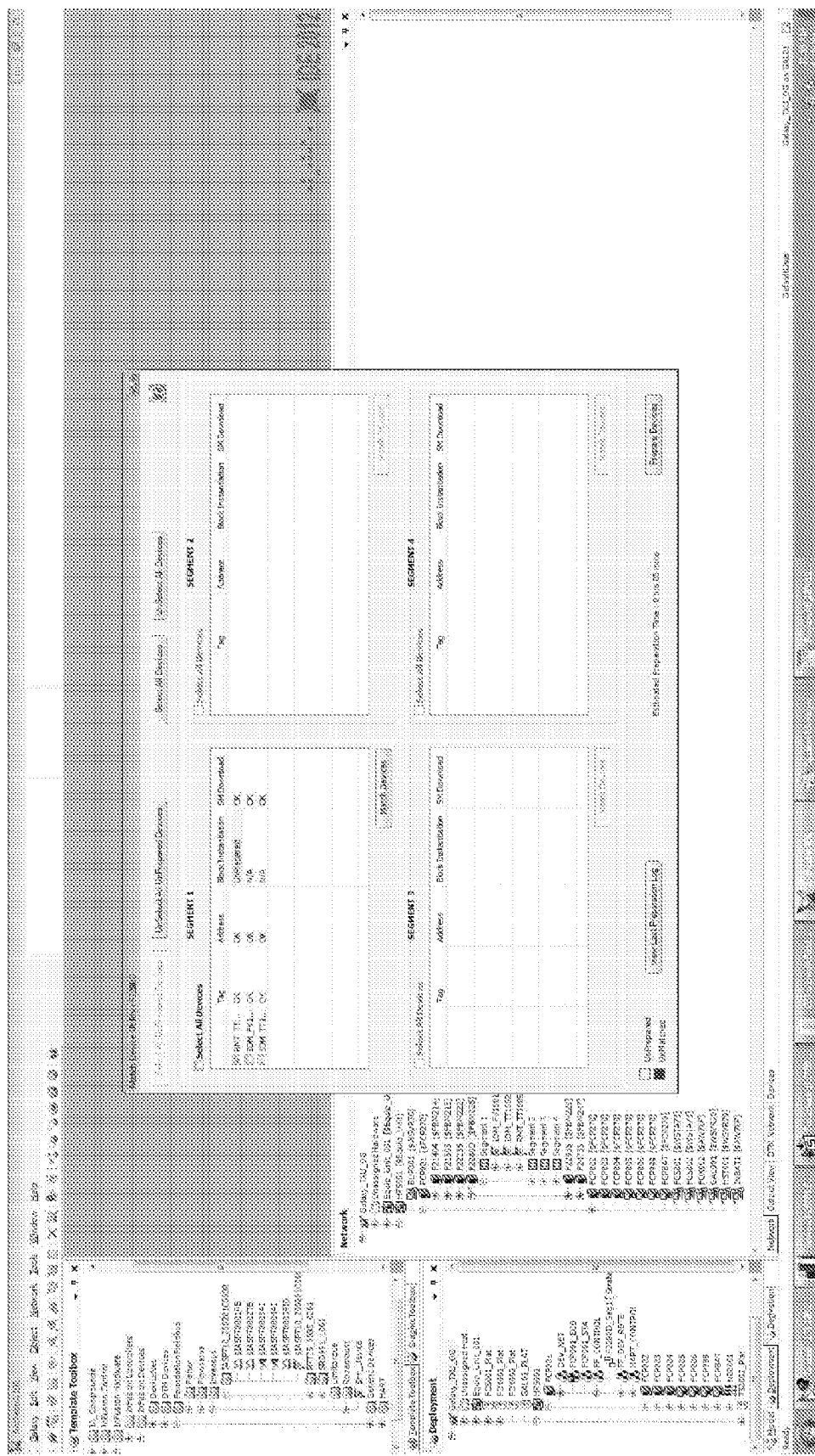

In one embodiment, the computing device 135 displays summary results indicating, among other things, which installed field devices were successfully updated and prepared for continued operation and which installed field devices did not successfully update, as illustrated in FIG. 9A. In some embodiments, the second preparation status for each installed field device, as described above, is stored in a preparation log, whereby the computing device 135 displays at least a portion of the preparation log as summary results in the user interface. For each device not successfully updated, the second preparation status includes, but is not limited to, information indicating one or more errors encountered during updating the configuration information of the device. In the exemplary screen shots illustrated in FIG. 9B-9D, the user may display summary results by selecting "View Last Log" (FIG. 9B), "View Log" (FIG. 9C), and/or "View Last Preparation Log" (FIG. 9D).

The computing system environment of device 135s described above is only one example of a suitable computing environment and is not intended to suggest any limitation as to the scope of use or functionality of features described herein. Neither should the computing environment be interpreted as having any dependency or requirement relating to any one or combination of components illustrated or described herein.

Aspects of the invention are operational with numerous other general purpose or special purpose computing system environments or configurations. Examples of well known computing systems, environments, and/or configurations that may be suitable for use with aspects of the invention include, but are not limited to, personal computers; server computers; smart televisions (TVs with computer processors); portable and hand-held devices such as personal digital assistants (PDAs), tablet PCs or laptop PCs; multi-processor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing aspects of the invention includes a general purpose computing device in the form of a conventional computer 1020, including a processing unit 1021, a system memory 1022, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system (BIOS) 1026, containing the basic routines that help transfer information between elements within the computer 20, such as during start-up, may be stored in ROM 1024.

The computer 1020 may also include a magnetic hard disk drive 1027 for reading from and writing to a magnetic hard disk 1039, a magnetic disk drive 1028 for reading from or writing to a removable magnetic disk 1029, and an optical disk drive 1030 for reading from or writing to removable optical disk 1031 such as a CD-ROM or other optical media. The magnetic hard disk drive 1027, magnetic disk drive 1028, and optical disk drive 30 are connected to the system bus 1023 by a hard disk drive interface 1032, a magnetic disk drive-interface 33, and an optical drive interface 1034, respectively. The drives and their associated computer-readable media provide nonvolatile storage of computer-executable instructions, data structures, program modules, and other data for the computer 1020. Although the exemplary environment described herein employs a magnetic hard disk 1039, a removable magnetic disk 1029, and a removable optical disk 1031, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 1039, magnetic disk 1029, optical disk 1031, ROM 1024, and/or RAM 1025, including an operating system 1035, one or more application programs 1036, other program modules 1037, and program data 1038. A user may enter commands and information into the computer 1020 through keyboard 1040, pointing device 1042, or other input devices (not shown), such as a microphone, joy stick, game pad, satellite dish, scanner, or the like. These and other input devices are often connected to the processing unit 1021 through a serial port interface 1046 coupled to system bus 1023. Alternatively, the input devices may be connected by other interfaces, such as a parallel port, a game port, or a universal serial bus (USB). A monitor 1047 or another display device is also connected to system bus 1023 via an interface, such as video adapter 1048. In addition to the monitor, personal computers typically include other peripheral output devices (not shown), such as speakers and printers.

The computer 1020 may operate in a networked environment using logical connections to one or more remote computers, such as remote computers 1049a and 1049b. Remote computers 1049a and 1049b may each be another personal computer, a server, a router, a network PC, a peer device or other common network node, and typically include many or all of the elements described above relative to the computer 1020, although only memory storage devices 1050a and 1050b and their associated application programs 1036a and 1036b have been illustrated in FIG. 10. The logical connections depicted in FIG. 10 include a local area network (LAN) 1051 and a wide area network (WAN) 1052 that are presented here by way of example and not limitation. Such networking environments are commonplace in office-wide or enterprise-wide computer networks, intranets and the Internet.

When used in a LAN networking environment, the computer 1020 is connected to the local network 1051 through a network interface or adapter 1053. When used in a WAN networking environment, the computer 1020 may include a modem 1054, a wireless link, or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing communications over wide area network 1052 may be used.

One or more aspects of the invention may be embodied in computer-executable instructions (i.e., software), such as a software object, routine or function (collectively referred to herein as a software) stored in system memory 1024 or non-volatile memory 1035 as application programs 1036, program modules 1037, and/or program data 1038. The software may alternatively be stored remotely, such as on remote computer 1049a and 1049bb with remote application programs 1036b. Generally, program modules include routines, programs, objects, components, data structures, etc. that perform particular tasks or implement particular abstract data types when executed by a processor in a computer or other device. The computer executable instructions may be stored on a computer readable medium such as a hard disk 1027, optical disk 1030, solid state memory, RAM 1025, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

While the invention has been described in connection with specific embodiments thereof, it will be understood that the inventive device is capable of further modifications. This patent application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

What is claimed is:

1. A method for preparing a plurality of installed field devices for operation in a process control network, said plurality of installed field devices in communication with a communication network, said method comprising:

displaying, by a computing device connected to the communication network, a user interface providing a visual summary of the installed field devices to a user, said user interface indicating a first preparation status of each installed field device, with the first preparation status including one of a prepared status, a ready-to-prepare status, and a not-ready-to-prepare status;

providing a storage device storing a configuration database, said database including predefined device preparation scopes, each device preparation scope being indicative of one or more of the installed field devices and a containment relationship among the installed devices;

receiving, via the user interface by the computing device, a designation by the user of one or more predefined device preparation scopes for preparing the plurality of installed field devices, wherein the user interface displays a visual indicator for each displayed field device included in one or more of the designated device preparation scopes indicating that one or more of the designated device preparation scopes includes the indicated field devices having the containment relationship to be prepared in a batch; and implementing, by the computing device, each of the one or more received device preparation scopes for updating the configuration of each of the plurality of installed field devices, wherein implementing each of the one or more received device preparation scopes includes:

retrieving from the configuration database configuration information for each installed field device, the retrieved configuration information corresponding to the designated device preparation scopes, wherein retrieving includes matching the installed field devices to the configuration database; and transmitting the retrieved configuration information for each installed field device via the communication network to each installed field device for updating the configuration of each installed field device for continued operation, said transmitting to the plurality of installed field devices occurring substantially in parallel in the batch.

2. The method of claim 1, said process control network including one or more control processors and one or more field bus modules, each of the installed field devices being operatively connected to one of the field bus modules, each of the field bus modules being operatively connected to one of the control processors, said one or more control processors being operatively connected to the communication network, wherein transmitting the retrieved configuration information includes:

batching, by the computing device, a plurality of the retrieved configuration information for each installed field device into one or more batches, each batch corresponding to one of the control processors, said batching based on the field bus modules connected to the control processor and based on the installed field devices connected to the field bus modules;

transmitting, by the computing device, each batch to its corresponding control processor for further processing, each control processor receiving and transmitting the appropriate retrieved configuration information via its connected field bus module to the installed field devices connected to its field bus module, said one or more control processors receiving and transmitting in parallel.

3. The method of claim 1, wherein displaying a user interface further includes providing at least one graphical progress bar indicating the relative completion of the preparing the one or more installed field devices for operation and an estimated time to completion.

4. The method of claim 1, said first preparation status further including a failed-to-prepare status.

5. The method of claim 1, wherein implementing each of the one or more received device preparation scopes further includes:
receiving, in response to transmitting the retrieved configuration information, a second preparation status from each installed field device by each received device preparation scope, said second preparation status including one of a prepared status or failed-to-prepare status; and
storing the received second preparation status for each installed field device in the configuration database.

6. The method of claim 5, wherein displaying a visual summary of the installed field devices further includes:
retrieving the stored second preparation status for each installed field device; and
displaying the retrieved second preparation status for each installed field device as its first preparation status in the user interface.

7. The method of claim 1, wherein displaying a visual summary of the installed field devices further includes:
interrogating by the computing device each installed field device;
determining a current configuration status from each installed field device based on the interrogating; and
displaying the determined current configuration status for each installed field device as its first preparation status in the user interface.

8. The method of claim 1, said implementing each of the one more received device preparation scopes being indicative of one or more installed field devices located in a particular geographic or operational area.

9. The method of claim 8, said operational area includes at least one of a, compound and a plant area.

10. The method of claim 1, further comprising:
receiving, by the computing device, a user selection of one or more of the updated installed field devices for enabling control of said field devices; and
enabling control the one or more of the updated installed field devices based on the received user selection.

11. The method of claim 1, wherein providing a storage device further includes storing a plant layout model representing the relationship between the one or more installed field devices, the one or more field bus modules, and the one or more control processors.

12. The method of claim 1, further comprising querying the field devices for identifying information and executing matching rules based on the identifying information to pair the field devices to a database of devices that can be coupled to the network, wherein said implementing each of the one or more received device preparation scopes is responsive to the querying and executing.

13. The method of claim 12, wherein the identifying information comprises an existing tagname and address.

14. A system for preparing a plurality of installed field devices for operation, said system comprising:
a plurality of installed field devices, with each installed field devices being operatively connected a communication network;
a configuration database accessible via the communication network, said configuration database including configuration information corresponding to each installed field device;
a computer processor configured to execute computer-executable instructions stored in a storage device, said instructions for:
displaying a user interface to a user, said user interface including visual summary of the installed field devices, said summary indicating a first preparation status of each installed field device, with the first preparation status including one of a prepared status, a failed-to-prepare status, a ready-to-prepare status, and a not-ready-to-prepare status;
receiving a designation of one or more predefined device preparation scopes from the user for preparing the plurality of installed field devices via the user interface, each device preparation scope being indicative of one or more of the installed field devices and a containment relationship among the installed devices, wherein the user interface displays a visual indicator for each displayed field device included in one or more of the designated device preparation scopes indicating that one or more of the designated device preparation scopes includes the indicated field devices having the containment relationship to be prepared in a batch; and
implementing each of the one or more received device preparation scopes for preparing the plurality of installed field devices, each scope being configured for enabling parallel execution of the received device preparation scopes, wherein implementing each of the one or more received device preparation scopes comprises:
retrieving configuration information for each installed field device indicated by each device preparation scope, based on the first preparation status, from the configuration database, wherein retrieving includes matching the installed field devices to the configuration database; and
transmitting the retrieved configuration information for each installed field device to each installed field device for updating the configuration of each installed field device for continued operation said updating of each of the installed field devices occurring substantially in parallel in the batch.

15. The system of claim 14, said system further comprising one or more control processors and one or more field bus modules, each of the installed field devices being operatively connected to one of the field bus modules, each of the field bus modules being operatively connected to one of the control processors, said one or more control processors being operatively connected to the communication network.

16. The system of claim 15, wherein transmitting the retrieved configuration information includes instructions for:
batching, by the computing device, the retrieved configuration information for each installed field device indicated by each received device preparation scope into one or more batches, each batch corresponding to one of the control processors, said batching based on the field bus modules connected to the control processor and the installed field devices connected to the field bus modules;
transmitting, by the computing device, each batch to its corresponding control processor for further processing, whereby each control processor can further transmit the appropriate preparation information and configuration information to each connected field bus module based on the installed field devices, said preparation information updating the installed field devices connected to each said field bus module and said configuration information for delivery to the installed field devices connected to each said field bus module, each control processor functioning in parallel.

17. The system of claim 14, wherein implementing each of the one or more received device preparation scopes further includes instructions for:
- receiving, in response to transmitting the retrieved configuration information, a second preparation status from each installed field device, said second preparation status including one of a prepared status or failed-to-prepare status; and
- storing the received second preparation status for each installed field device in the configuration database.

18. The system of claim 17, where the second preparation status is stored in a preparation log accessible via the communication network for reporting.

19. The system of claim 17, wherein displaying a visual summary of the installed field devices further includes instructions for:
- retrieving the stored second preparation status for each installed field device; and
- displaying the retrieved second preparation status for each installed field device as its first preparation status.

20. The system of claim 14, wherein displaying a visual summary of the installed field devices further includes instructions for:
- interrogating each installed field device;
- determining a current configuration preparation status from each installed field device; and
- displaying the determined current status for each installed field device as its first preparation status.

21. The system of claim 14, said instructions further comprising instructions for:
- receiving a user selection of one or more of the updated installed field devices for enabling control of said field devices; and
- enabling control the one or more of the updated installed field devices based on the received user selection.

22. The system of claim 14, said system further comprising a plant layout model representing the relationship between the one of more installed field devices, the one or more field bus modules, and the one or more control processors within the physical plant.

23. The system of claim 14, further comprising a database of devices that can be coupled to the network, and wherein said instructions further comprise instructions for:
- querying the field devices for identifying information; and
- executing matching rules based on the identifying information to pair the field devices to the database of devices that can be coupled to the network.

24. The system of claim 23, wherein the identifying information comprises an existing tagname and address.

* * * * *